United States Patent [19]
Edamura

[11] Patent Number: 5,274,209
[45] Date of Patent: Dec. 28, 1993

[54] MICROWAVE OVEN

[75] Inventor: Kaoru Edamura, Nara, Japan

[73] Assignee: Sharp Kabushiki Kaisha, Osaka, Japan

[21] Appl. No.: 779,508

[22] Filed: Oct. 18, 1991

[30] Foreign Application Priority Data

Oct. 22, 1990 [JP] Japan ................................ 2-284962

[51] Int. Cl.⁵ ............................................. H05B 6/68
[52] U.S. Cl. ...................... 219/10.55 B; 219/10.55 A; 219/10.55 E; 219/10.55 R; 219/506; 99/325; 364/477; 364/705.01; 426/243; 426/523
[58] Field of Search ................ 219/10.55 B, 10.55 A, 219/10.55 F, 10.55 E, 10.55 R, 10.55 M, 506, 508, 492; 99/325, 451; 364/477, 705; 426/243, 523

[56] References Cited

U.S. PATENT DOCUMENTS

| | | | |
|---|---|---|---|
| 4,323,773 | 4/1982 | Carpenter | 219/10.55 R |
| 4,370,545 | 1/1983 | Hotta et al. | 219/10.55 B |
| 4,415,789 | 11/1983 | Nobue et al. | 219/10.55 B |
| 4,628,351 | 12/1986 | Heo | 219/10.55 B |
| 4,629,848 | 12/1986 | Yokozeki et al. | 219/10.55 B |
| 4,780,588 | 10/1988 | Edamura | 219/10.55 B |
| 4,841,125 | 6/1989 | Edamura | 219/10.55 B |
| 4,933,527 | 6/1990 | Edamura | 219/10.55 B |
| 4,968,864 | 11/1990 | Doi et al. | 219/10.55 B |
| 4,972,060 | 11/1990 | Edamura | 219/10.55 B |

FOREIGN PATENT DOCUMENTS 0366137  5/1990  European Pat. Off. .
0454143 10/1991  European Pat. Off. .
62-19501  7/1985  Japan .

OTHER PUBLICATIONS

Partial English translation of Japanese Patent Publication No. 62-19501.

Primary Examiner—Bruce A. Reynolds
Assistant Examiner—Tu Hoang

[57] ABSTRACT

A microwave oven includes a cooking unit for cooking food according to a cooking program for specifying cooking procedure, a cooking control data memory for storing cooking control data for controlling cooking, a selecting device for selecting one of the cooking programs and providing it to the cooking unit in response to operation by an operator, a use frequency memory for storing frequency of selection of each cooking program, a device for grouping cooking programs into groups corresponding to their frequencies of use, and a display device for displaying information related to the number of cooking programs which belong to each of the groups. The conditions of use of the cooking programs can be known easily.

44 Claims, 20 Drawing Sheets

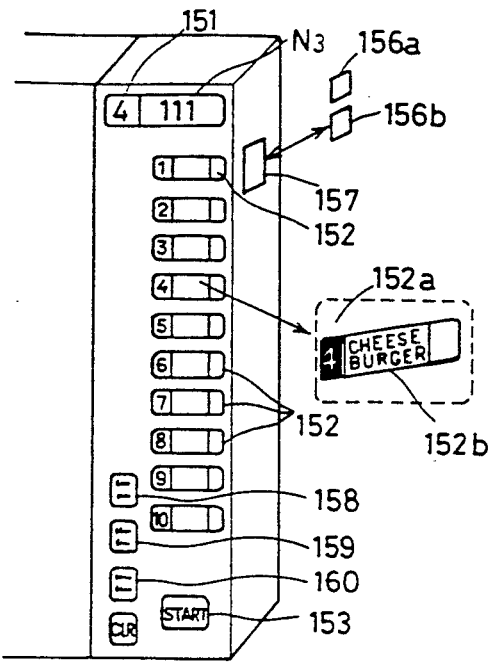
FIG. 8 PRIOR ART
FIG. 9 PRIOR ART
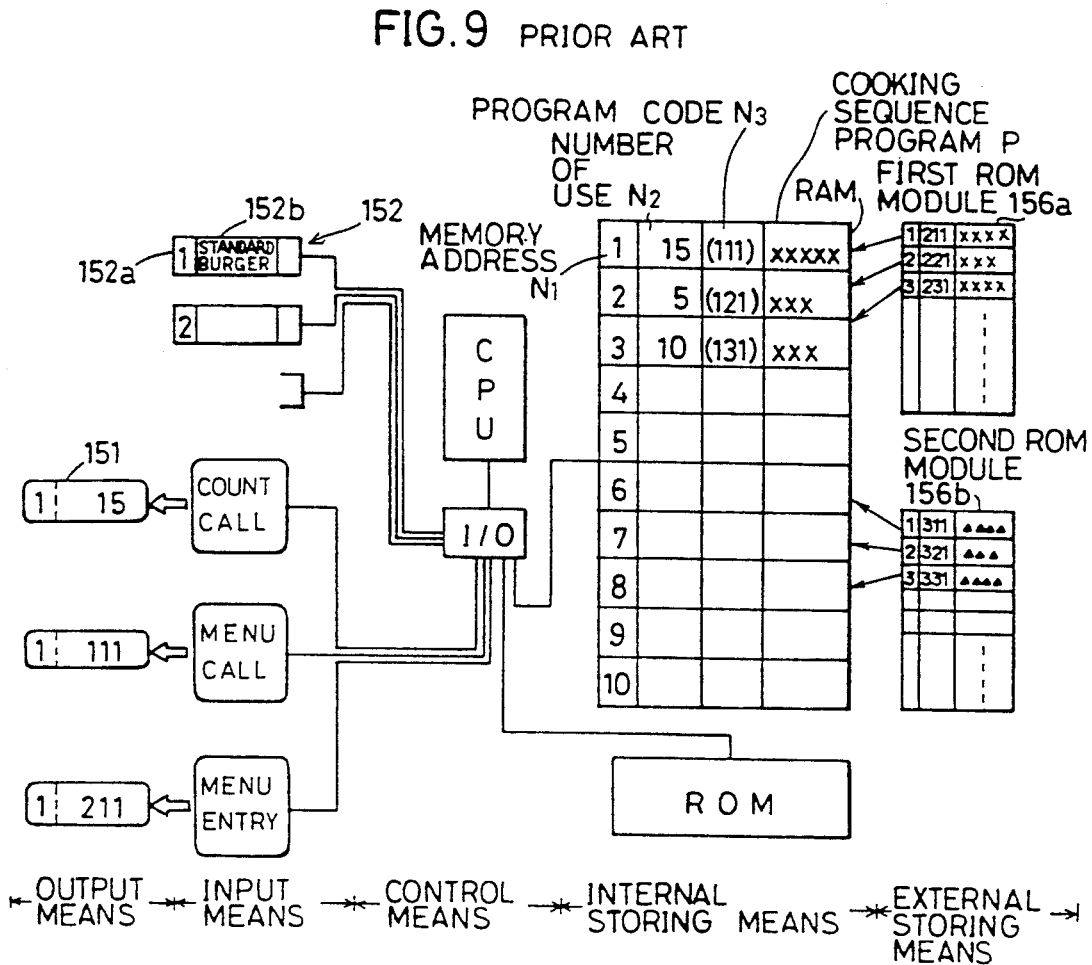

FIG.19

| ADDRESS | | |
|---|---|---|
| 0 0 1 0 | DATA AREA FOR DATA RETRIEVAL | 301 |
| 1 0 1 0 | NUMBER OF USE MANAGEMENT PROGRAM STORING AREA | 302 |
| 2 0 1 0 | COOKING PROGRAM STORING AREA | 303 |
| 3 0 1 0 | COMPLETELY COOKED DISH IMAGE DATA AREA | 304 |
| 4 0 1 0 | MAIN MATERIAL IMAGE DATA AREA | 305 |
| 5 0 1 0 | SUB-MATERIAL IMAGE DATA AREA | 306 |
| 6 0 1 0 | MENU NAME DISPLAY DATA AREA | 307 |
| 7 0 1 0 | COUNT MODE DISPLAY DATA AREA | 308 |
| 8 0 1 0 | OPERATION KEY DISPLAY DATA AREA | 309 |
| 9 0 1 0 | FUNCTION KEY DISPLAY DATA AREA | 310 |

FIG. 20

| ADDRESS NUMBER | MENU CODE | MAIN MATERIAL CODE | SUB-MATERIAL CODE 1 | SUB-MATERIAL CODE 2 | CODE OF IMAGE OF APPEARANCE OF COOKED DISH | NUMBER OF TIMES OF USE |
|---|---|---|---|---|---|---|

FIG. 21

| ADDRESS NUMBER | PROGRAM CODE | • USE CONDITION ANALYSYS • SYMBOL DISPLAY PROGRAM • SELECTED USE FREQUENCY CORRESPONDING MENU • SYMBOL DISPLAY PROGRAM • COOKING PROGRAM NUMBER OF USE COUNT PROGRAM (PROGRAM FOR MANAGING NUMBER OF USE) |
|---|---|---|

FIG. 22

| ADDRESS NUMBER | COOKING PROGRAM CODE | COOKING PROGRAM |
|---|---|---|

FIG. 23

| ADDRESS NUMBER | VIDEO CODE OF APPEARANCE OF DISH | VIDEO DATA OF APPEARANCE OF DISH | COOKING PROGRAM CODE |
|---|---|---|---|

FIG. 24

| ADDRESS No. | MAIN MATERIAL CODE | MAIN MATERIAL VIDEO DATA |
|---|---|---|

FIG. 25

| ADDRESS No. | SUB-MATERIAL CODE | SUB-MATERIAL VIDEO DATA |
|---|---|---|

FIG. 26

| ADDRESS No. | MENU NAME CODE | MENU NAME DISPLAY DATA |
|---|---|---|

FIG. 27

| ADDRESS No. | COUNT MODE CODE | COUNT MODE DISPLAY DATA (CHARACTER·SYMBOL) |
|---|---|---|

FIG.28
| ADDRESS No. | OPERATION KEY CODE | "CLOCK"<br>"COUNT"<br>"CATEGORY"<br>"MATERIAL"<br>"MICRO"<br>"GRILL"<br>"MAIN"<br>"SUB"<br>"MENU" |
|---|---|---|
(OPERATION KEY NAME DISPLAY DATA)
FIG.29
| ADDRESS No. | FUNCTION KEY CODE | "LOCK"<br>"CANCEL" |
|---|---|---|
(FUNCTION KEY NAME DISPLAY DATA)
FIG.30
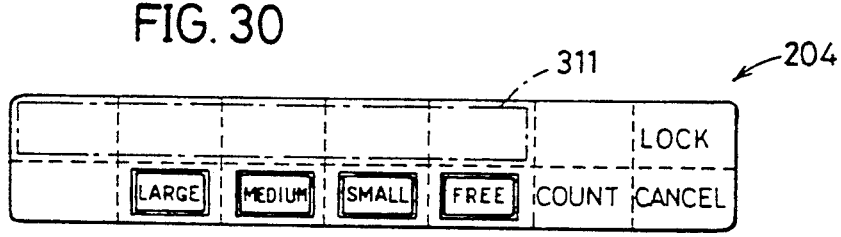
FIG.31
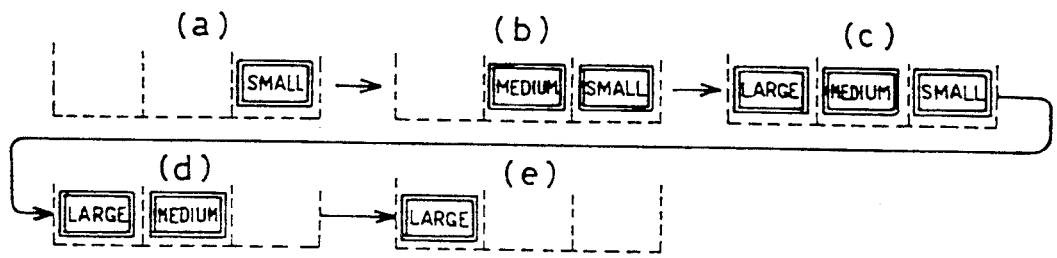

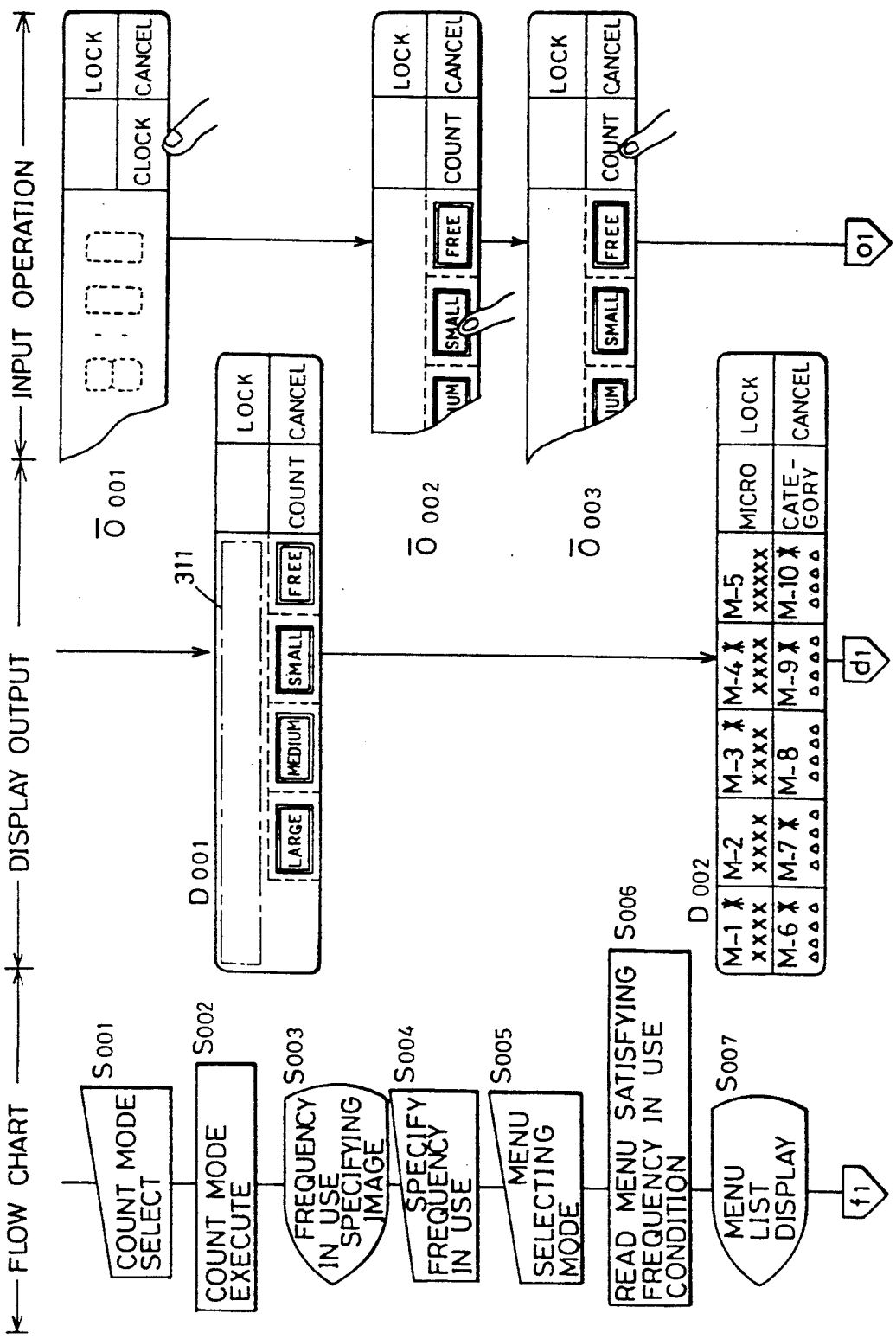

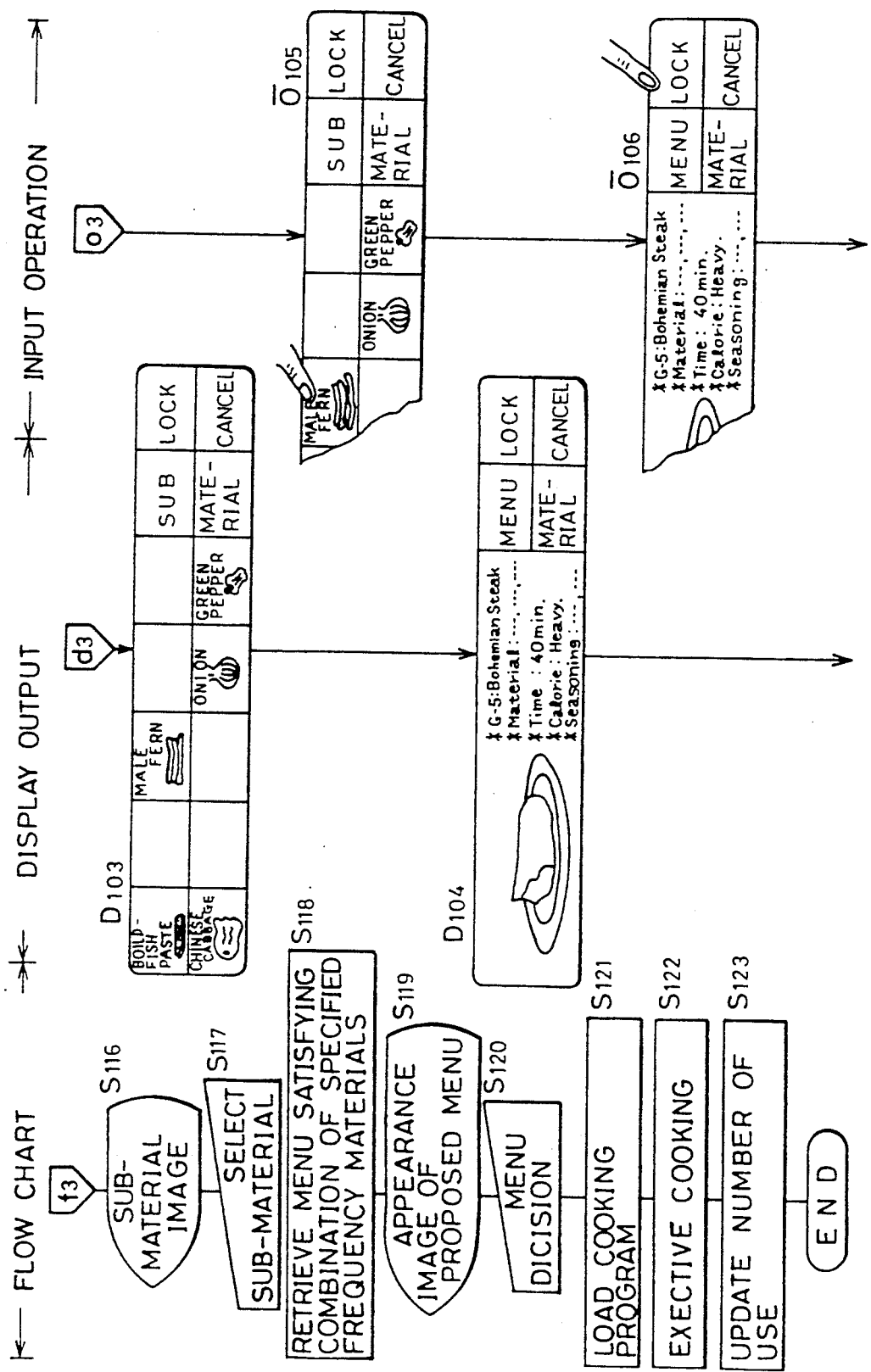

MICROWAVE OVEN

BACKGROUND OF THE INVENTION

1. Field of the Invention

The present invention relates to microwave ovens, and particularly an improved control system and operation method of a microwave oven which includes a microcomputer and operates according to a cooking program stored in a memory.

2. Description of the Related Art

With enlargement of heating functions of a microwave oven, practicable cooking methods have been improved and the number of available menus also has been increased. The enlargement of heating functions includes, more specifically, introduction of a heater as heating means and use of an inverter power supply as a power source.

Utilization of such functions under sequence control by a microcomputer has brought forth heating cooking methods such as grill heating, oven heating, so-called composite heating (in which the microwave heating and the heater heating are alternately performed), and simultaneous heating (in which the microwave output and the heater output are performed according to a predetermined ratio).

With the expansion of the cooking menus, the microwave cooking, the heater cooking, the composite heating cooking, the simultaneous heating cooking and the like have been applied to a large number of ovens utilizing microcomputers and sensor devices, to implement the automation of cooking.

For facilitating use of automated heating cooking methods as described above by users, menu keys for selection of various kind cooking programs and so forth are provided on a cooking portion control cooking which is referred to as a control unit of a common microwave oven.

FIG. 1 is an external view of a conventional microwave oven. Referring to FIG. 1, the microwave oven includes an outer case cabinet 101, an oven door 102, an oven tray 103, a roller stay 104 and a control unit 105a.

FIG. 2 is an enlarged view of a panel portion of control unit 105a. The panel portion includes a display 106, first menu keys 107, a cancel key 108, a heating switch 109, second menu keys 110, heating mode selecting keys 111 and a timer knob 112.

The heating mode selecting key 111 and the timer knob 112 are provided for manually setting cooking programs of menus which cannot be covered by first menu keys 107 and second menu keys 110.

In an operation portion of control unit 105a, as shown in FIG. 3, outlines of the menu keys or names thereof are printed. Also, it includes an overlay 113 having contacts on the backside, a circuit board 116 in which input switches are provided, a membrane sheet 114 for securing contact between each contact provided in overlay 113 and a contact of a corresponding input switch on circuit board 116 when a predetermined position in overlay 113 is depressed, and a spacer 115.

In a conventional microwave oven in which the heating cooking is automated, a plurality of menu keys 107, 110 are provided for selecting cooking programs in a limited space on control unit 105a. Each of menu keys 107 and 110 is assigned to a particular program. Accordingly, limited by the operability of menu keys and the visual recognizability of menu names, it is impossible to provide more than a certain number of menu keys.

If the number of menu keys is increased as much as possible in the limited space on control unit 105a, the number of unnecessary menu keys for a user in each selection increases. Accordingly, a problem is that it is troublesome to find out one desired menu key in a large number of menu keys provided.

In order to solve such a problem, a microwave oven shown in FIG. 4 is disclosed in Japanese Patent Application No. 63-274239. The gist of the application is to display in a "time divisional" manner with video information the layout or menu names of menu keys 107, 110 provided in a control unit 105a which has been introduced in a conventional microwave oven. The application thus has an object of overcoming the problem of the menu key arrangement on control unit 105a of a conventional microwave oven.

Referring to FIG. 4, the microwave oven includes an outer case cabinet 101 having an oven cavity 117, an oven door 102, a roller stay 104, a heating element 118 and a control unit 105b.

FIG. 5 is an enlarged view of a panel portion of control unit 105b. The panel portion includes a display 119, menu name displays 120, menu selecting switches 121, an operation mode selecting switch 122 and an operation mode name display 123. Display 119, menu name displays 120 and operation mode name display 123 are formed of color liquid crystal displays.

The character information and the video information outputted to display 119, menu name displays 120, operation mode name display 123 are recorded in a so-called IC (Integrated Circuit) card or a so-called RAM (Random Access Memory) pack, an external storing means which will be described later. However, information of the operation mode names outputted to operation mode name display 123 (e.g., character strings such as "CLOCK", "MICRO", "GRILL" and "READY") is stored in an operation controlling ROM (Read-Only Memory not shown) provided in control unit 105b.

FIG. 6 is a schematic diagram illustrating external appearances of an IC card 124a or a RAM pack 124b each of which is external storing means and storage structure of a main memory, which store various kinds of cooking information to be stored in a main memory 12 (including RAM) provided in control unit 105b.

Such kinds of information recited below are stored in IC card 124a or RAM pack 124b, and are stored in corresponding areas in main memory 12.

(1) Contents information ... stored in a data area 125a. This is information for displaying stored contents of main memory 12 in display 119.

(2) Cooking program ... stored in an area 125b.

(3) Menu video data ... stored in an area 125c. The data is video information indicative of appearance of a selected dish to be displayed in display 119.

(4) Menu name data ... stored in an area 125d. It is video information of a menu name or color illustration for having a user recognize a menu name to be displayed in menu name display 120.

In the data areas of IC card 124a or RAM pack 124b, that is, in the data areas of main memory 12, various cooking information such as cooking programs, menu video data, menu name data are classified and stored for each heating cooking method (the microwave heating, the grill heating and the like).

Referring to FIGS. 4-7, the transition and operation of display in control unit 105b in the microwave oven will be described in the following. Every time operation mode selecting switch 122 is depressed, the operation modes change in a predetermined order (FIG. 7(a)→(b)→(c)→(d)→(e)). When one cycle of menus is finished, the operation mode returns to the initial operation mode (FIG. 7 (e)→(a)).

The operation modes include such modes as recited below.

(1) Clock display mode (FIG. 7 (a))

At the time of power-up of control unit 105b, or when the main body of the microwave oven is not operating for cooking, a time display mode is effected. An example of the operation mode display at that time is "CLOCK".

(2) Microwave cooking mode (FIG. 7 (b))

During the heating more, oscillation of microwave generating means such as a magnetron effects heating. A display example of a mode title in this case is "MICRO". In this operation mode, in menu name displays 120, names of menus to be subjected to the microwave cooking (or with corresponding illustrations of the menus) are displayed. In FIG. 7(b), the names of menus are displayed as "M - 1", "M - 2", "M - 3".

(3) Grill cooking mode (FIG. 7 (c))

During heating mode, heating is effected by 118. An example of the operation mode display in this case is "GRILL". In this operation mode, names of menus for the grill cooking are displayed in menu name displays 120. In FIG. 7 (c), the names of menus are shown as "G - 1", "G - 2", "G - 3".

Three operation modes have been described above. Upon depression of menu selecting switch 121 in each operation mode, the display further changes. For example, FIG. 7 (d) illustrates the appearance of control unit 105b when a menu selecting switch 121 corresponding to the menu name "G - 3" is depressed. An image showing the appearance of the dish corresponding to menu G - 3 is displayed in display 119.

FIG. 7 (e) shows control unit 105b when menu selecting switch 121 for the menu G - 3 is depressed once again in the state indicated in FIG. 7 (d). The names of menus outputted to menu name display 120 in FIG. 7 (d) are erased except the selected menu G - 3. Display 119 displays a message indicating that the menu G - 3 is selected. The message "READY" indicative of finish of a menu selecting operation is outputted to operation mode name display 123.

As clearly seen from the above description, upon depression of operation selecting switch 122, operation modes are switched. Furthermore, by changing the names of menus outputted to menu name displays 120 correspondingly, it is implemented to display the menu key layout in a "time divisional" manner.

As clearly seen from the above description, the microwave oven shown in FIGS. 4-6 solves the problems of the conventional microwave oven of commercial model shown in FIGS. 1-3. That is, the operability of menu keys and limited space on a panel of control unit 105b are maintained while it is possible to use as many cooking programs as possible. Measures taken for solving the problems are to store necessary various kinds of cooking information in an external storage means such as an IC card, thereby enabling exchange of information to be stored in a main memory of a control unit whenever desired, and to switch display contents corresponding to the operation with a menu name display portion formed of a liquid crystal display.

Such measures make it possible to use the developed programs as possible while keeping the high operability of the menu keys within the limitation of heating hardwares. As an image of an appearance of a selected dish is displayed on a color liquid crystal display, confirmation of the selected result is also facilitated.

Furthermore, as a result, the following are enabled. It is assumed that a user has not selected his desired menu yet. The user can depress some menu selecting switches in this case to compare and evaluate images of completed dishes outputted. As a result of the evaluation, a menu which is determined to be the most preferable can be selected finally. The selection is made on the basis of a subjective reference of the user obtained by comparing appetites inspired by the images of menus.

Besides such subjective reference as described above, is it envisioned to enable selection of menus with more objective reference. FIGS. 8 and 9 illustrate a microwave oven capable of counting the number of use of cooking programs every time cooking is performed using the microwave oven and storing the number of times in a memory. In the microwave oven, a user can make the number of use of cooking programs displayed if need be. The user thus can check the latest number of use of respective cooking programs for menus. Such a microwave oven is for business use, which is mainly used in so-called "fast food" shops. This kind of microwave oven is described in Japanese Utility Model Laying-Open No. 62-19501, for example.

FIG. 8 illustrates an operation panel portion of a control device in the above-described microwave oven for business use. Referring to FIG. 8, the operation panel includes a display 151 for outputting information of a selected cooking program, dedicated menu keys 152 for specifically addressing cooking programs stored in a memory corresponding to each menu, a heating start key 153, an attachment 157 to the main body of a control device for memory modules 156a, 156b such as a RAM pack in which cooking programs are stored, a count number call key 158 for inputting an instruction for reading the number of use for each dedicated menu key 152 (the number of use of cooking programs) from a memory and outputting it to display 151, a cooking program input key (MENU ENTRY) 159 for instructing transfer (load) of cooking programs stored in memory modules 156a, 156b to a main memory provided inside responsive to an instruction of a microcomputer provided in the control device, and a program code output key 160 for outputting to display 151 a program code N3 of a cooking program stored in an address of a main memory corresponding to each dedicated menu key 152.

Program code output key 160 is for use when the user checks if the contents of a cooking program and a menu name written in each dedicated menu key 152 correctly correspond to each other. As to the attachment 157 of memory modules 156a, 156b, in the figure, the access panel which is opened and closed when attaching and detaching a memory module is shown.

In FIG. 8, an example is illustrated in which display 151 makes a display meaning that the code N3 of a cooking program stored in an address corresponding to No. 4 of dedicated menu key 152 in the main memory is "111".

FIG. 9 is a block diagram of this microwave oven. In FIG. 9, the microwave oven is displayed divided into output means, input means, control means, internal storing means and external storing means from left to right.

Input means includes dedicated menu keys 152 and three kinds of operation keys (COUNT CALL key 158, MENU CALL key 160, MENU ENTRY key 159).

Output means includes a display 151. Corresponding display is made in the display 151 when an operation key is operated.

Control means includes a microcomputer having a CPU (Central Processing Unit), an operation control ROM, and an input/output interface (I/O).

Storing means includes a RAM. The RAM is referred to as a main memory in order to distinguish it from external storing means (memory module) described later.

The RAM shown in the figure stores information indicative that the number N2 of use of a cooking program (P) of a menu assigned to No. 1 of dedicated menu keys 152 (in the figure "standard hamburger") is fifteen times and the program code N3 thereof is "111".

When a new cooking program is stored in the RAM from the ROM module 156a which is one example of a memory module, as shown in FIG. 9, a cooking program of cooking program code 211 is stored in address N1 in the main memory assigned to No. 1 dedicated menu keys 152, a cooking program of program code 221 is stored in the second one, and the cooking program of the program code 231 is stored in the third one.

In the main memory, corresponding to the number of dedicated menu keys 152, ten addresses N1-N10 are prepared, for example. For each address, a location for storage of the number of use N2, a location for storage of the cooking program code N3, and a location for storage of cooking program P are prepared.

The external storage means is a memory module, which includes a RAM pack or ROM modules 156a, 156b and so forth, for example.

Information stored in each location except the number of use N2 is supplied from external storing means such as ROM module 156a, 156b or the like.

Although not shown in FIG. 9, at the time when a drive signal is sent to an electronic buzzer for producing a cooking finish informing signal produced when the cooking operation of the microwave oven main body by the cooking program P is finished, a signal is transmitted to a corresponding address of a memory of cooking programs the number N2 of use is incremented by 1.

The main features of a function of counting the number of use of cooking programs in a microwave oven for business purpose having such structure as described above are:

(1) The operation for selecting a cooking program of a desired menu in a plurality of prepared menus can be made by selecting a dedicated menu key 152 specifically assigned to each menu and depressing the key. A cooking program stored in an address of a memory corresponding to the selected menu is thus read out.

(2) The number of use of each cooking program is re-written and stored at the time when an instruction indicative of output of a cooking finish informing signal is executed.

(3) The counted result can be checked whenever the user desires. The check is conducted independently of cooking by the menu selection. The operation for the check includes an operation of depressing a count number call key (COUNT CALL key) 158 and an operation of depressing a corresponding dedicated menu key 152 for specifying a cooking program which is an objective of the calling. As a result of the checking, a number of the specified menu key and the number of use thereof are outputted to display 151.

(4) The above-described checking operation is an operation required for checking the number of use of a single cooking program. When checking a plurality of programs, the above-described checking operation is repeated for a desired number of times.

(5) The data outputted as a result of the operation of checking is the unprocessed number of times of use for each individual cooking program. It is left to the user himself how to interpret the data and what to do on the basis of the interpretation.

The microwave oven described in the second place has the following problems. In the microwave oven, an image of appearance of a dish is outputted in display 119 (FIG. 5). It enables a method of use in which a user selects a desired menu after seeing the appearance image. As described above, the selection is based on the subjective reference of the user.

On the other hand, a main user of a microwave oven (a housewife, for example) basically considers information related to favorite dishes of family members, nutritive condition, foods stored in a refrigerator, and various dishes introduced in TV cooking programs and the like.

However, it appears that in practical use by most of users, the menus are selected strongly reflecting favorites of the user rather than the above-identified various elements It is recognized that this often happens in the case of a so-called "poor cook" or users who cannot take enough time for preparing dishes because of some reason.

Especially, it seems that when at a loss about the menu, most of the users select menus mainly on the basis of their own favorites. Here exists a possibility of occurrence of unbalanced menu selection.

Under such circumstances, if a microwave oven is used in which the menu selection is enabled through an effect of inspiring appetite with video information of a completed dish, it is possible that the unbalanced menu selection may be greatly amplified. Accordingly, if a large number of cooking programs are availably prepared in external storing means, it is highly possible that a lot of programs are not used.

However, in any of the above-described conventional microwave ovens, it is very difficult to use all of the prepared cooking programs uniformly. That is, it is extremely difficult to equally use prepared cooking programs. It is also difficult to purchase an optional external medium at an appropriate time for cooking programs of new menus.

SUMMARY OF THE INVENTION

Accordingly, it is an object of the present invention to provide a microwave oven capable of facilitating appropriate control of total conditions of use of a plurality of cooking programs.

A microwave oven according to the present invention includes a cooking device for cooking foods according to a cooking program specifying procedure of operation of cooking means, a cooking program memory for storing a plurality of cooking programs, a selecting device for selecting one of the plurality of cooking programs stored in the cooking program memory according to operation by a user and providing the program to the cooking device, a use frequency memory for storing a frequency of selection by the selecting device of each cooking program stored in the cooking program memory, a grouping device for grouping the plurality of cooking programs into a plurality of groups according to the frequencies in use of the plurality of cooking programs stored in the use frequency memory, and a use frequency information display for displaying information related to the number of cooking programs which belong to each group grouped by the grouping device.

In the above-described microwave oven, the use frequency memory updates and stores a frequency in use of a cooking program every time the cooking program stored in the cooking program memory is used. All the cooking programs are grouped into a plurality of groups by the grouping device on the basis of the use frequencies thereof. The information related to the number of cooking programs which belong to each of the groups is displayed by the use frequency information display. Accordingly, the distribution of frequencies in use of the cooking programs stored in the cooking program memory can be easily confirmed.

In a microwave oven of a preferable embodiment of the present invention, the use frequency information display includes a use frequency distribution pattern match detecting device for detecting a match between the of grouping by the grouping device of a plurality of cooking programs and a predetermined use frequency distribution pattern, and a display for displaying predetermined information corresponding to the predetermined use frequency distribution pattern which is detected to be coincident with the result of grouping of use frequency of a plurality of cooking programs by the use frequency distribution pattern match detecting device.

In the above-described microwave oven, when coincidence is determined between distribution of the frequencies in use and a particular pattern, particular information which has been assigned to the pattern is displayed. Accordingly, in this case, a user does not have to interpret the frequency-in-use information displayed in the frequency-in-use information display and can make selection of the following cooking according to the displayed particular information.

A microwave oven of a further preferable embodiment of the present invention further includes a transfer device for transferring a cooking program to a cooking program memory from an external storing medium storing a plurality of cooking programs, the use frequency distribution pattern match detecting device including a detecting device for detecting that all the cooking programs are selected for the number of times larger than a predetermined number of times.

In the microwave oven, when all the cooking programs stored in a cooking program memory are used for a predetermined number of times or more, particular information, e.g., a message saying that the cooking programs stored in the cooking program memory should be exchanged, is displayed. A user can know with the message the timing at which new cooking programs should be transferred to the cooking program memory from a new external storing medium.

In a microwave oven of a still further preferable embodiment of the present invention, the selecting device includes a use frequency specifying device for specifying a desired use frequency by specifying one of a plurality of groups grouped by the grouping device, and the use frequency information display includes a retrieving device for retrieving a cooking program having a frequency in use within a range specified by the use frequency specifying device from a cooking program memory and a device for presenting the cooking program retrieved by the retrieving device to a user.

In the above-described microwave oven, a user can specify retrieval of a cooking program within a predetermined use frequency range, e.g., a cooking program with a low frequency in use using a use frequency specifying device. As the retrieved cooking program is presented to the user, the user can easily know a cooking program having a particular frequency in use.

According to a further preferable embodiment of the present invention, the cooking program selecting device includes a group selecting device for a user to select a particular one of groups; a cooking specifying information producing device for searching the cooking control data memory as required by a user and producing a list of information for specifying a cooking program; a determination device for making a determination as to whether each cooking control data retrieved by the cooking specifying information producing device belong to the selected group or not, and, for the cooking control data which is determined to belong to the group, adding particular information to a corresponding portion of the list produced by the cooking specifying information producing device; a display device for displaying in a visually recognizable manner a list produced by the cooking specifying information producing device; and a display manner changing device for displaying an element corresponding to a cooking program determined to belong to the selected group by the determining device in a manner different from the case in which it is determined otherwise.

According to the above-described microwave oven, a user selects a particular group, and then a cooking program with a particular frequency in use corresponding to the group is displayed in a manner different from other cooking programs. When trying to selectively perform a cooking program with a particular frequency in use, it is extremely facilitated for a user to make a determination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings which are given by way of illustration only, and thus are not limitative of the present invention, and wherein:

FIG. 8 is a perspective view of a main portion illustrating a display panel of another example of a conventional microwave oven;

FIG. 9 is a block diagram of the microwave oven shown in FIG. 8;

FIG. 19 is a schematic diagram illustrating data structure of a main memory of a microwave oven according to the present invention;

FIGS. 20-29 are schematic views illustrating data structure of each area of a main memory;

FIG. 30 is an example of display in a color liquid crystal display;

FIG. 31 is an schematic diagram illustrating a pattern of standard change with time of symbols displayed in a color liquid crystal display;

FIGS. 37A, 37B, and 38A-38C are operation charts illustrating operations of a microwave oven according to the present invention.

DESCRIPTION OF THE PREFERRED EMBODIMENTS

Figure 1:
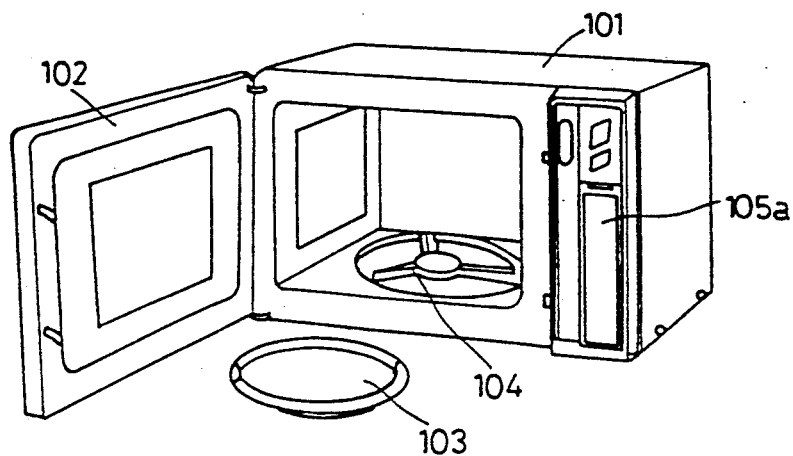
FIG. 1 is an external appearance view of a first example of a conventional microwave oven.
Figure 2:
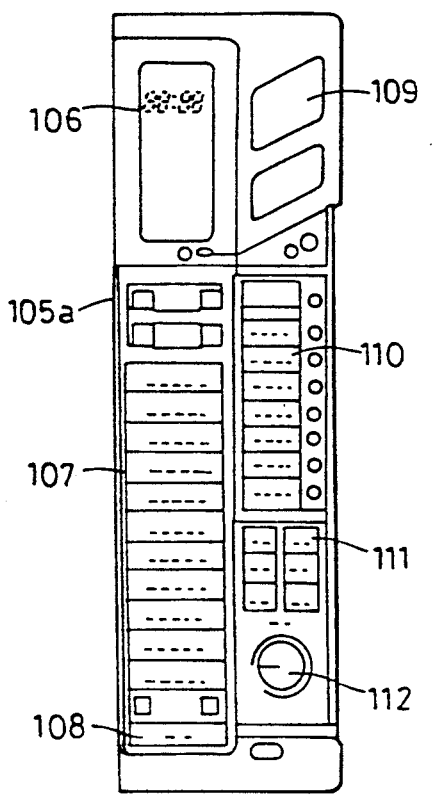
FIG. 2 is plan view of an operation panel of the conventional microwave oven shown in FIG. 1.
Figure 3:
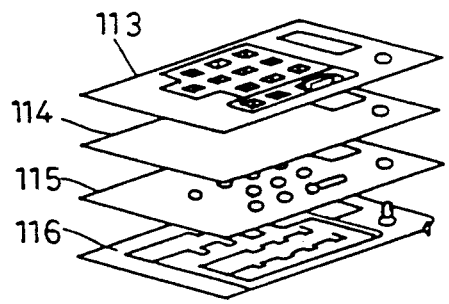
FIG. 3 is an exploded view of an operation panel portion.
Figure 4:
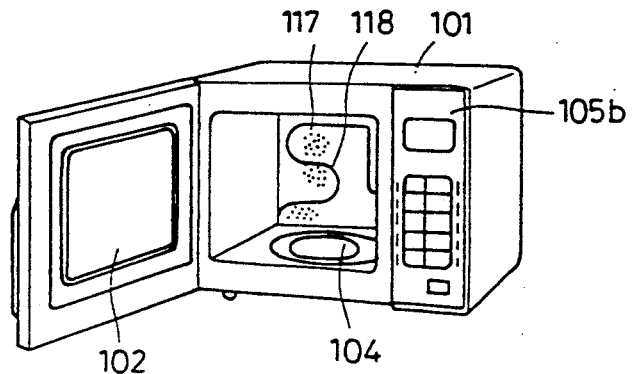
FIG. 4 is an external appearance view of a second example of a related microwave oven.
Figure 5:
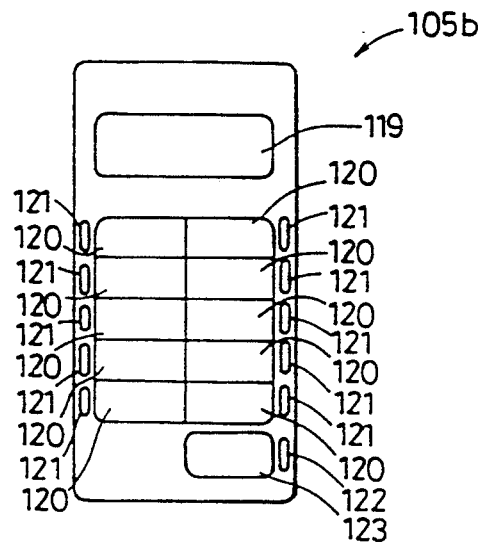
FIG. 5 is a plan view of an operation panel of the microwave oven shown in FIG. 4.
Figure 6:
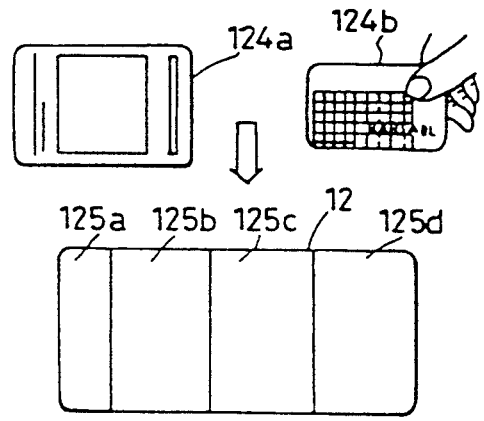
FIG. 6 is a schematic diagram illustrating an external storing media and a main memory of the microwave oven shown in FIG. 4.
Figure 7:
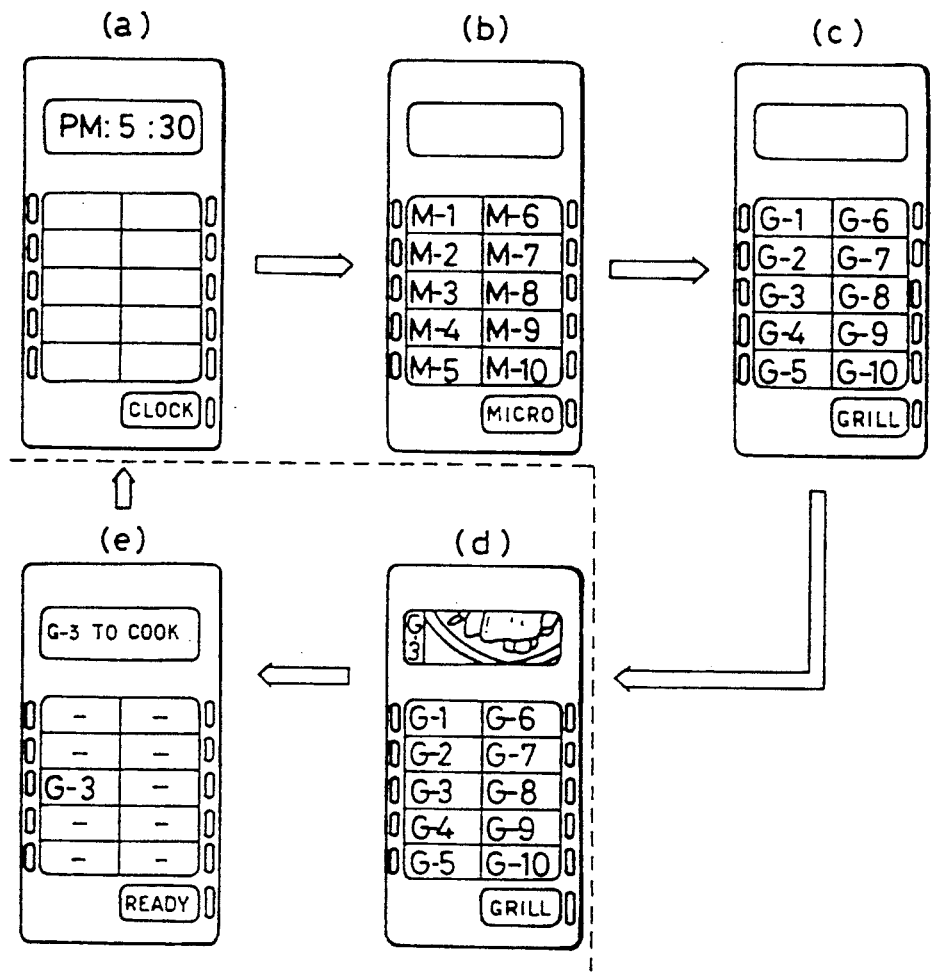
FIG. 7 is a schematic diagram illustrating transition of display in the display panel of the microwave oven shown in FIG. 4.
Figure 10:
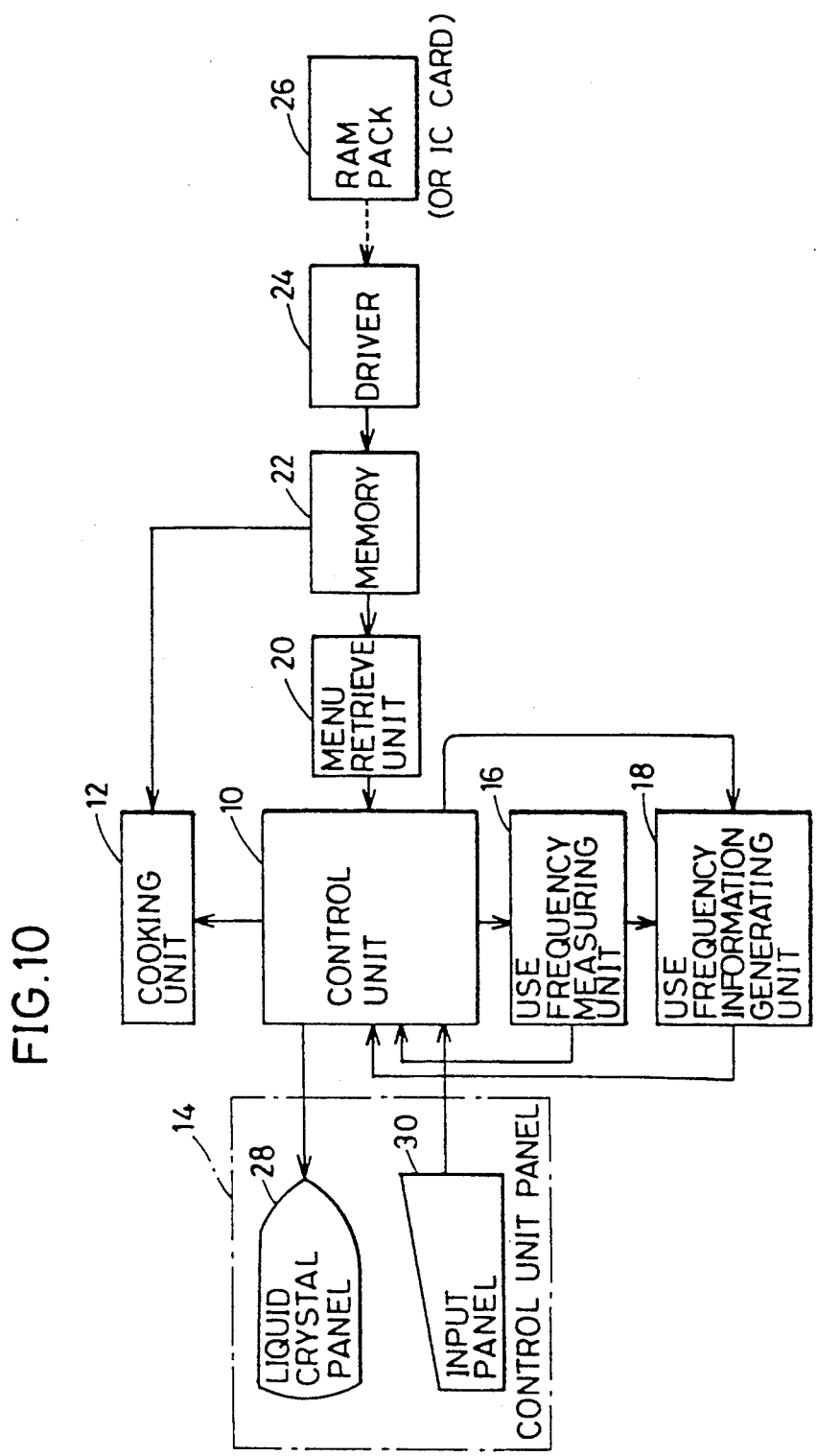
FIG. 10 is a block diagram illustrating principle structure of a microwave oven according to the present invention.

FIG. 10 is a block diagram schematically illustrating a structure of a microwave oven according to the present invention. Referring to FIG. 10, the microwave oven includes a control unit 10 for controlling the entire device, a control unit panel 14 as a man-machine interface between controlling unit 10 and a user, a cooking unit 12 having heating means such as a magnetron and controlled by controlling unit 10 for executing a cooking program by controlling the magnetron or the like according to a provided cooking program, a memory 22 for storing cooking programs to be executed by cooking unit 12 and related data, a menu retrieving unit 20 connected to controlling unit 10 and memory 22 for retrieving a cooking program selected by a user through controlling unit panel 14 on the basis of an instruction from controlling unit 10 and providing the program to controlling unit 10, a driver 24 for transferring cooking programs to memory 22 from a RAM pack 26 (or an IC card) which is an external storing medium storing a plurality of cooking programs, a use frequency measuring unit 16 connected to controlling unit 10 for measuring a frequency in use of a cooking program selected by the user by means of controlling unit panel 14, and a use frequency information producing unit 18 connected to use frequency measuring unit 16 for producing predetermined information about the frequency in use of cooking programs stored in memory 22 and providing the information to controlling unit 10.

Controlling unit panel 14 includes a liquid crystal panel 28 connected to controlling unit 10 for outputting cooking program menus, use frequency information and so forth stored in memory 22, and an input panel 30 with which a user provides predetermined information to controlling unit 10.

Figure 11:
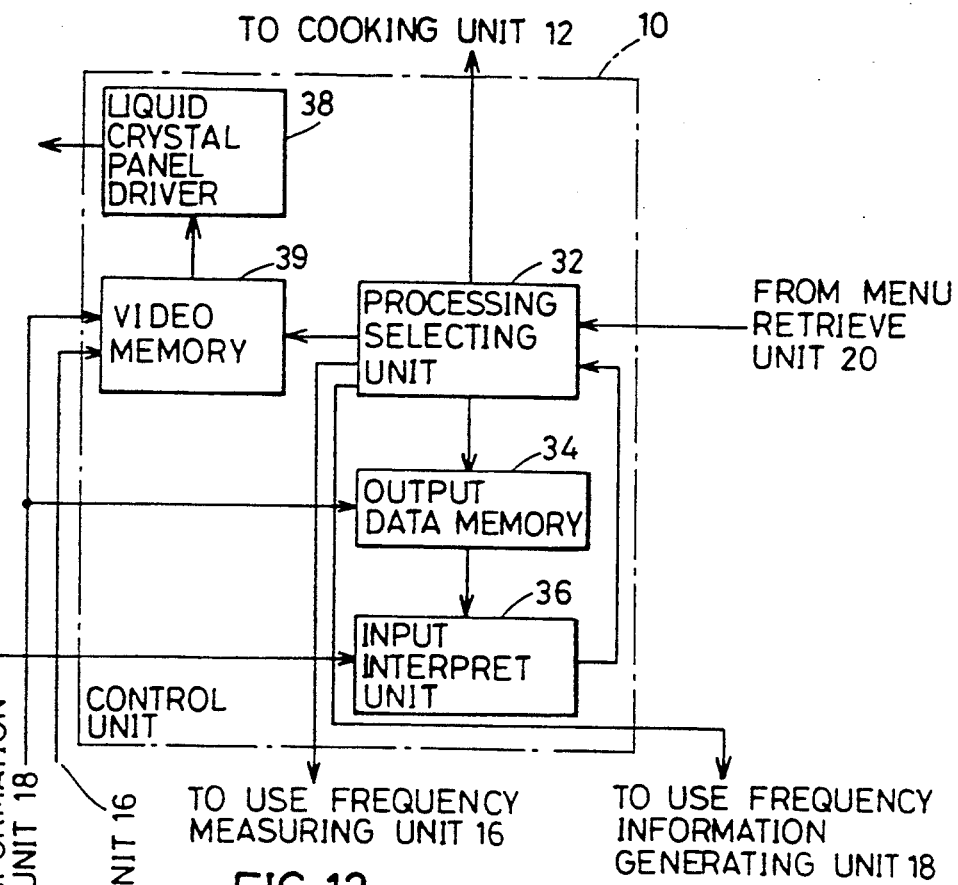
FIG. 11 is a block diagram of a controlling unit.

Referring to FIG. 11, controlling unit 10 includes a processing selecting unit 32 for receiving information related to cooking programs stored in memory 22 from menu retrieving unit 20, producing information to be displayed in liquid crystal panel 28, and selecting next processing on the basis of the information provided from input panel 30, and also for, when a particular cooking program is specified by a user, providing information specifying that program to cooking unit 12, a video memory 39 connected to use frequency measuring unit 16 and use frequency information producing unit 18 for recording a video signal to be displayed in liquid crystal panel 28 applied from each unit, a liquid crystal panel driver 38 connected to video memory 39 for displaying the video information stored in video memory 39 by driving liquid crystal panel 28, an output data memory 34 connected to processing selecting unit 32 and use frequency information producing unit 18 for storing what information is displayed in liquid crystal panel 28. The controlling unit 10 also includes an input interpreting unit 36 connected to output data memory 34 and input panel 30 for referring to information provided from input panel 30 and stored contents of output data memory 34 to interpret information provided by the user and applying the information to processing selecting unit 32.

Figure 12:
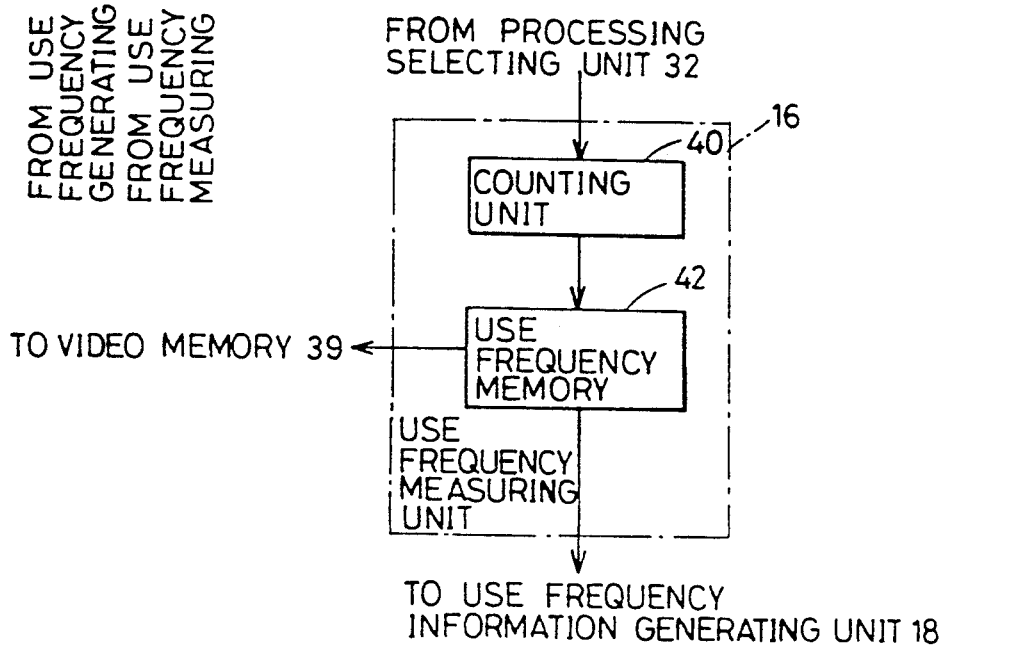
FIG. 12 is a block diagram of a use frequency measuring unit.

Referring to FIG. 12, use frequency measuring unit 16 includes a counting unit 40 connected to processing selecting unit 32 for counting the frequency in use of a cooking program loaded in cooking unit 12 by processing selecting unit 32 and executed, and use frequency memory 42 connected to counting unit 40 for storing frequencies of use of executed cooking programs with respect to all the cooking programs stored in memory 22 and also for, with respect to a cooking program having a predetermined use frequency, according to an instruction from processing selecting unit 32, applying that information to video memory 39.

Figure 13:
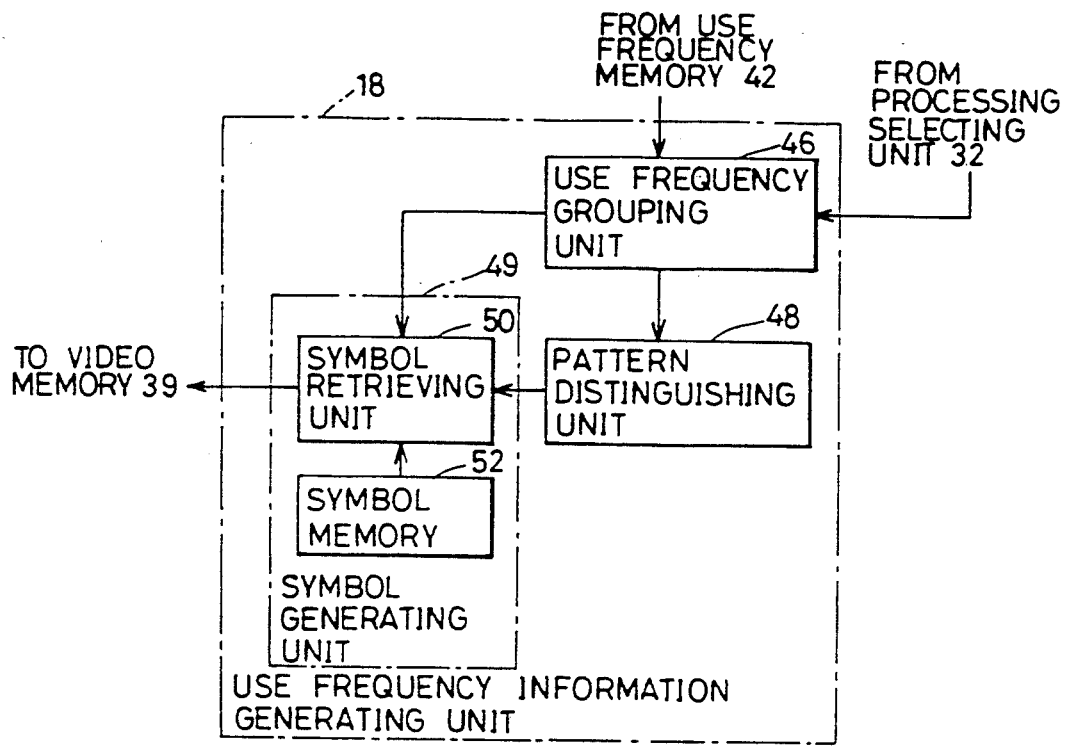
FIG. 13 is a block diagram of a use frequency information generating unit.

Referring to FIG. 13, use frequency information generating unit 18 includes a use frequency grouping unit 46 connected to use frequency memory 42 for grouping into a predetermined plurality of groups the frequencies in use of all the cooking programs of memory 22 stored in use frequency memory 42, a pattern distinguishing unit 48 connected to use frequency grouping unit 46 for distinguishing whether the pattern of use frequency distribution of all the cooking programs of memory 22 grouped by use frequency grouping unit 46 coincides with a predetermined pattern or not, and a symbol generating unit 49 connected to use frequency grouping unit 46 and pattern distinguishing unit 48 for applying a signal indicative of a predetermined symbol to video memory 39 corresponding to the grouped use frequency pattern and the pattern specified by pattern distinguishing unit 48.

Symbol generating unit 49 includes a symbol memory unit 52 for storing symbol video information determined corresponding to a pattern of a predetermined use frequency distribution, and a symbol retrieving unit 50 connected to use frequency grouping unit 46 and pattern distinguishing unit 48 for searching symbol memory 52 on the basis of the information related to the distribution pattern of the frequency in use and the distinguished particular pattern and retrieving a corresponding symbol and applying the symbol to video memory 39.

Figure 14:
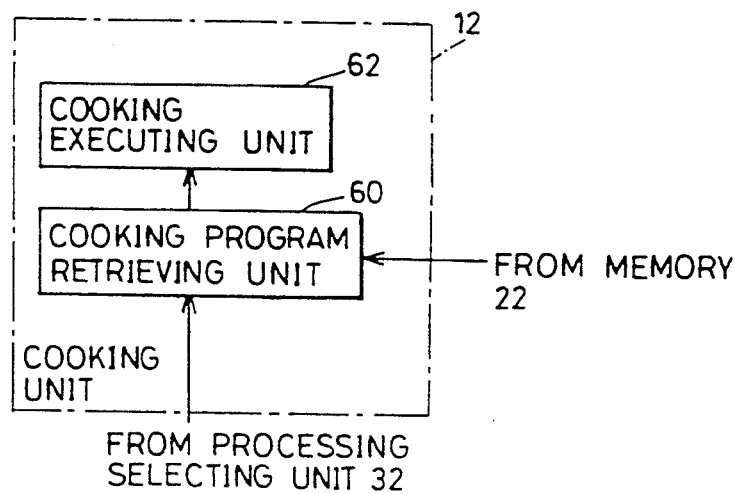
FIG. 14 is a block diagram of a cooking unit.

Referring to FIG. 14, cooking unit 12 includes a cooking program retrieving unit 60 for searching memory 22 on the basis of information for specifying a cooking program selected by a user provided from controlling unit 10 and retrieving a corresponding cooking program, and a cooking executing unit 62 for executing cooking in accordance with a predetermined sequence according to the cooking program applied from cooking program retrieving unit 60.

Referring to FIGS. 10-14, the principle of operation of the microwave oven will be described in the following. A user purchases a RAM pack (or an IC card) 26, and cooking programs stored in RAM pack 26 are transferred to and stored in memory 22 through driver 24.

Processing selecting unit 32 of control unit 10 usually outputs information related to time measured by a timer (not shown) and information related to guide of operation to video memory 39. The time display information and operation guide information stored in video memory 39 are displayed on liquid crystal panel 28 through liquid crystal panel driver 38. The information related to the data displayed on liquid crystal panel 28 is also stored in output data memory 34. With this data, functions assigned to respective keys in input panel 30 can be distinguished.

A user performs the following process when cooking. The user depresses a corresponding key in input panel 30 according to the information displayed in liquid crystal panel 28. Thus, a predetermined signal (code) corresponding to that key is applied to input interpreting unit 36. Input interpreting unit 36 refers to the data related to the information displayed in liquid crystal panel 28 stored in output data memory 34 and the inputted code to interpret the meaning of the information inputted by the user. The interpreted information is applied to processing selecting unit 32.

The selection of cooking is made as described below, for example. An operator sees the display in liquid crystal panel 28 and depresses a given key in input panel 30 for specifying the selection of cooking for a predetermined number of times. Input interpreting unit 36 refers to a code applied from input panel 30 and information stored in output data memory 34 to make a determination that the user wants to select menus, and applies a signal indicative of that to processing selecting unit 32.

Processing selecting unit 32, in response to the signal, receives data indicating contents of cooking programs stored in memory 22 retrieved by menu retrieving unit 20 and displays the data on liquid crystal panel 28.

The operator confirms the information displayed on liquid crystal panel 28 again, and depresses a certain key on input panel 30 for a certain number of times to specify a desired menu. Thus, a code indicating that the key was depressed is applied to input interpreting unit 36.

Input interpreting unit 36 refers to data indicating a list of menus displayed in liquid crystal panel 28 stored in output data memory 34 and the code applied from input panel 30 to determine a menu the user needs, and applies a signal indicative of that menu to processing selecting unit 32.

Processing selecting unit 32 applies information specifying that menu to cooking program retrieving unit 60 in cooking unit 12 according to the information applied from input interpreting unit 36.

Cooking program retrieving unit 60 searches memory 22 on the basis of the information for specifying a cooking program applied from processing selecting unit 32 to retrieve a corresponding cooking program. Cooking program retrieving unit 60 applies the cooking program to cooking executing unit 62.

Cooking executing unit 62 operates a magnetron or the like according to the applied cooking program to perform a predetermined cooking sequence. The cooking selected by the user is thus executed.

After executing the cooking, processing selecting unit 32 applies a signal indicating the selected particular cooking program to use frequency measuring unit 16.

The counting unit 40 of use frequency measuring unit 16 counts up the number of times of use of the corresponding cooking program by 1 and provides it to use frequency memory 42. Use frequency memory 42 updates the frequency in use of all the cooking programs stored in memory 22 and stores the latest value.

When confirming the distribution of frequencies in use of all the cooking programs stored in memory 22, the user depresses a corresponding key in input panel 30. Thus, a signal indicating that the key is depressed is provided to input interpreting unit 36.

Input interpreting unit 36 refers to information stored in output data memory 34 and a code applied from input panel 30 to make a determination that check of conditions of use of cooking programs is specified, and applies a signal indicative of that to processing selecting unit 32.

Processing selecting unit 32 applies a signal instructing grouping of the frequencies in use to use frequency grouping unit 46 of use frequency information producing unit 18.

Use frequency grouping unit 46 reads frequencies in use of all the cooking programs stored in use frequency memory 42 and groups them into a predetermined plurality of groups on the basis of the ranges of the use frequencies. For example, use frequency grouping unit 46 groups cooking programs into four groups, i.e., cooking programs which have never been used, ones used one to three times, ones used four to six times, and ones used seven times or more.

Pattern distinguishing unit 48 makes a determination as to whether a pattern which is formed by the number of cooking programs which belong to each group coincides with a predetermined pattern. When a determination is made that it coincides with a predetermined pattern, pattern distinguishing unit 48 applies information indicating that and information for specifying that pattern to symbol retrieving unit 50.

Symbol retrieving unit 50 determines information specifying a symbol indicating a use frequency distribution pattern to be displayed on liquid crystal panel 28 according to the result of the operation of use frequency grouping unit 46 and the information applied from pattern distinguishing unit 48. Symbol retrieving unit 50 retrieves video information for displaying the determined symbol from symbol memory 52 and applies the same to video memory 39. Accordingly, when a user checks the condition of distribution of use frequencies of cooking programs, symbols indicating the distribution condition of use frequencies of cooking programs specified by symbol retrieving unit 50 are displayed.

With display of distribution condition of use frequency of cooking programs as described above, it is preferable to try to selectively execute cooking programs with particularly small frequency in use. In this device, for correcting unbalanced selection of cooking programs as described above, functions described below are provided. In liquid crystal panel 28, as described above, a distribution pattern of the frequencies in use is displayed as a combination of symbols indicating presence of programs which belong to each of the groups. A user, when selectively executing a program having a desired use frequency, depresses a predetermined key corresponding to symbols displayed on input panel 30 for specifying the specific frequency in use. A code produced by the key input indicating the predetermined frequency in use is applied to input interpreting unit 36.

Input interpreting unit 36 refers to output video information stored in output data memory 34 and the inputted code, recognizes that the user wants to select a cooking program having the predetermined use frequency, and applies a signal indicating that to processing selecting unit 32. Processing selecting unit 32 writes a menu of a cooking program stored in memory 22 in video memory 39 using menu retrieving unit 20 similarly to the above-described menu display. Processing selecting unit 32 also applies information indicating the specified use frequency and information indicating retrieval of the cooking program having that use frequency to use frequency memory 42 in use frequency measuring unit 16.

Use frequency memory 42 retrieves the stored contents according to the information applied from processing selecting unit 32 and applies information related to a program having the specified use frequency in the cooking programs to video memory 39. Then, it writes a symbol designating that it is a cooking program having the selected use frequency in a portion of an image designating the corresponding cooking program in video memory 39.

Accordingly, a list of cooking program menus is displayed in liquid crystal panel 28, and a symbol designating that it is a cooking program satisfying the frequency in use specified by the user is added to the corresponding program in the displayed cooking programs. The user selects the menu to which the symbol is added to easily correct the unbalanced frequencies in use of cooking programs as described above.

The above description has been made for describing principle structure and operation of the device. In an actual device, functions as described above are implemented mainly using a microcomputer. Also, various variations are possible about modes of menu selection. A microwave oven according to an embodiment of the present invention using a microcomputer will be described in detail with reference to the figures.

Figure 15:
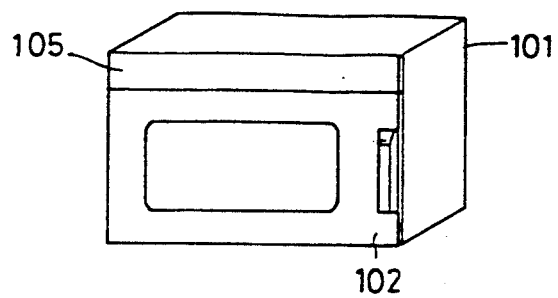
FIG. 15 is an external appearance view of a microwave oven according to the present invention.

FIG. 15 is an external view of a microwave oven according to the present invention. Referring to FIG. 15, the microwave oven includes an outer case cabinet 101, an oven door 102, and a control unit 105 laterally provided above oven door 102 in front of outer case cabinet 101 in which a unit controlling operation of the microwave oven is loaded.

Figure 16:
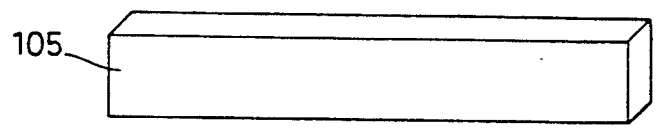
FIG. 16 is an enlarged view of a control unit of a microwave oven according to the present invention.
Figure 17:
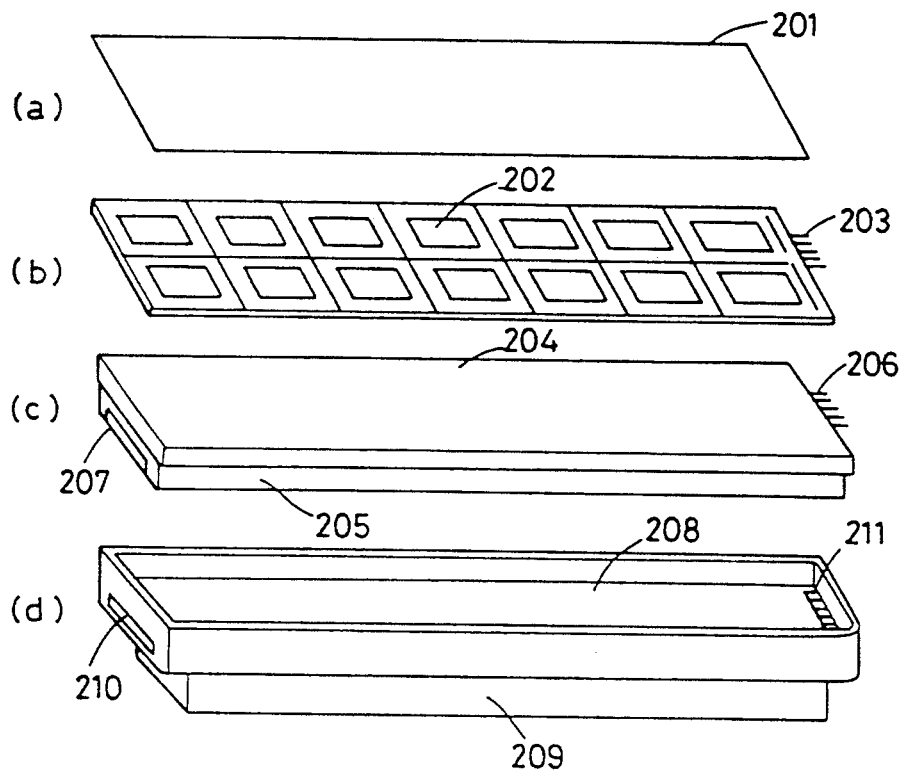
FIG. 17 is an exploded view of a control unit.

FIG. 16 is an enlarged view of control unit 105. FIG. 17 is an exploded view of control unit 105.

Referring to FIGS. 16 and 17, control unit 105 includes a color liquid crystal display 204, a transparent electrode sheet 202 provided laminating on color liquid crystal display 204 and having 14 switch sheets, a transparent overlay sheet 201 provided on transparent electrode sheet 202, a display control unit 205 provided below color liquid crystal display 204, and a control unit controller 209 on which an upper surface of a control unit panel 208 is provided. Transparent electrode sheet 202 has lead lines 203. Display 204 has lead lines 206 connected to lead lines 203. Display control unit 205 has an insert port 207 on its left side to which a RAM pack or an IC card described later is inserted. Although not shown in the figure, a contact of external storing means such as a RAM pack and display control unit 205 is provided in the inner part of insert port 207.

All the devices from overlay 201 to display control unit 205 are mounted on control unit panel 208. Control unit panel 208 includes an insert port 210 for external storing means formed on its left side. Shapes and positions of insert port 210 and insert port 207 are selected so that both of the insert ports 207 and 210 overlap with each other when assembling control panel 105.

Color liquid crystal display 204, transparent electrode sheet 202 and overlay 201 serve as liquid crystal panel 28 and input panel 30 shown in FIG. 10. That is, overlay sheet 201 is to be directly touched by a user with a finger for input operation. Transparent electrode sheet 202 is a switch corresponding to conventional menu selecting switches and various function switches. When the sheet 202 on overlay 201 is depressed, a predetermined signal is transmitted to display control unit 205 through lead lines 203, 206 and furthermore transmitted to display control unit 209.

Color liquid crystal display 204 is for displaying all the information of an input picture and information of an output picture on the basis of the video information and character information stored in the external storing means inserted into insert port 207.

Control unit controller 209 conducts functions of controlling all the control units (heating operation, lighting in an oven chamber, and so forth) except display by color liquid display 204 assigned to display control unit 205 and menu selecting operation by a user (selection of cooking programs).

A terminal 211 is provided in control unit panel 208. Terminal 211 contacts with a terminal (not shown) provided at a corresponding position in a bottom portion of display control unit 205 to form a transmission path for electronic information outputted from display control unit 205 to control unit controller 209.

Figure 18:
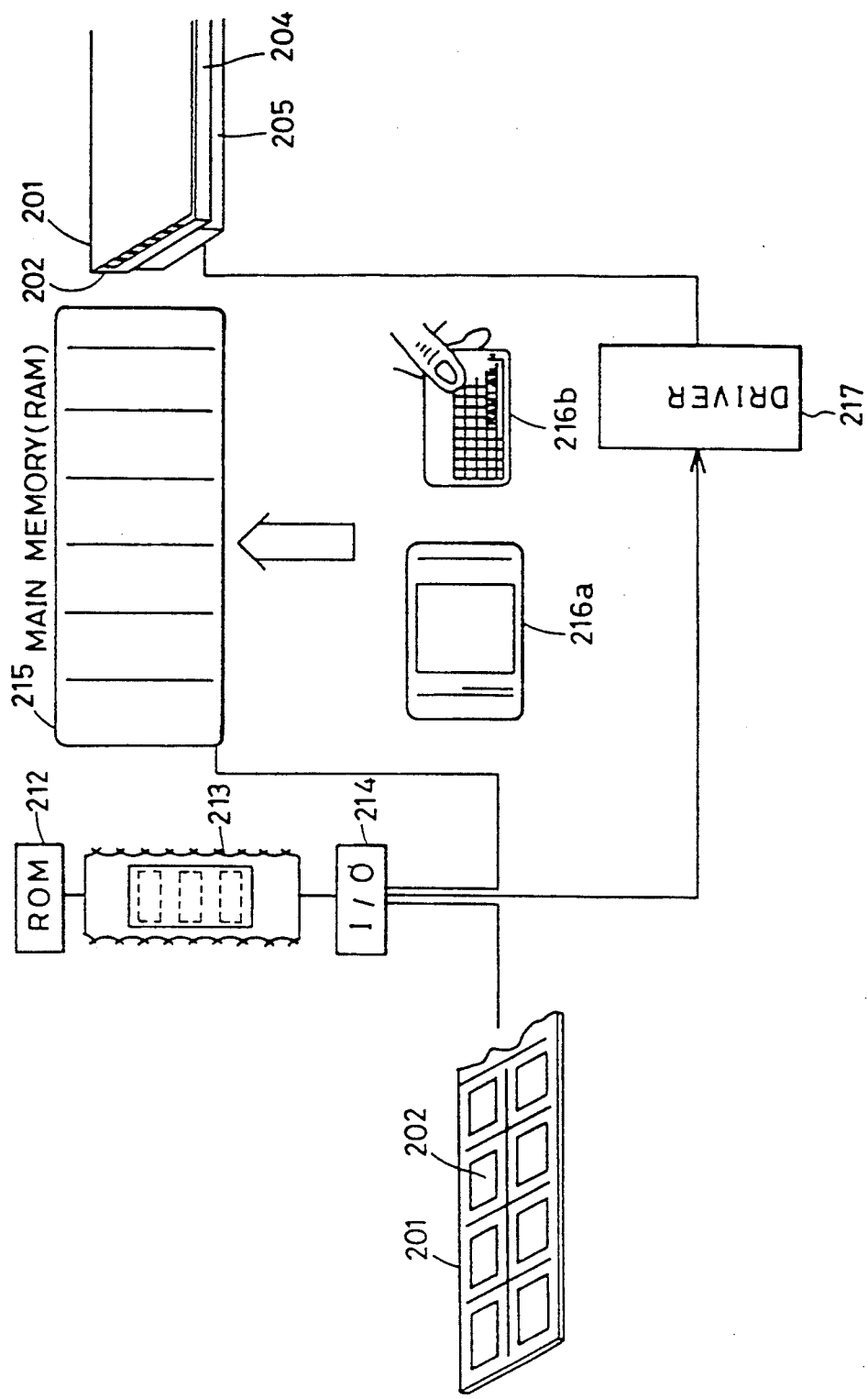
FIG. 18 is a block diagram in the case where a microwave oven according to the present invention is implemented using a CPU.

FIG. 18 is a block diagram of control unit 105. Control unit 105 is shown divided into units corresponding to input means, control means, storing means and output means from left to right in the figure.

Input means is for specifying an operation mode, menu and food material which a user needs. The input means includes a transparent electrode switch sheet 202 provided on color liquid crystal display 204 and a transparent overlay 201. These input means, color liquid crystal display 204, and display control unit 205 are referred to as a display unit in combination.

Control means conducts control of the display unit and control unit controller 209. Control means includes a CPU 213, a controlling ROM 212 and an input/output interface 214.

Storing means is for storing information necessary for operation by control unit 105. Storing means includes a main memory 215 including a RAM and an external storing means, or an IC card 216a or a RAM pack 216b. The external storing means has data structure the same as that in main memory 215, which stores a plurality of programs and data related thereto in advance. Loading of the data stored in IC card 216a or RAM pack 216b in main memory 215 is performed by inserting the above-mentioned IC card 216a or RAM pack 216b into insert port 210 provided on the left side of control unit panel 208. The data is stored in data areas in main memory 215 corresponding to each data area in IC card 216a or RAM pack 216b.

Output means includes a color liquid display 204. As described above, transparent electrode switch sheet 202 and overlay 201 are formed being laminated on display 204. Display 204 is connected to input/output interface 214 through driver 217.

FIGS. 19 and 20–28 show contents of data stored in each data area in main memory 215. The data stored in the main memory are generally divided into retrieval data, a program for managing the number of times of use, cooking programs, video information, name display data and symbol display data.

The retrieval data is stored in area 301 starting from an address 0010. The data is for retrieval in "selection of menus by specifying food materials" operation which will be described later. Referring to FIG. 20, there are provided at each address of the area, fields for storage of a menu code assigned to a certain menu, a main material code for specifying a material (a main material) used in the menu, two submaterial codes for specifying materials except the main material used in the dish, a dish appearance video code for specifying an image of the completely cooked menu, and the number of times each cooking program corresponding to that menu has been used.

Programs for managing the number of times in use of each cooking program are stored in area 302. Referring to FIG. 21, a program for analyzing a condition of use of the programs, displaying a necessary symbol, retrieving a cooking program having the frequency in use specified by an operator and displaying that it is the corresponding menu, counting the number in use of the cooking program, and so forth, is stored together with a program code. Each of the programs is for implementing characteristic functions of the present invention which will be described below. Area 302 starts from an address 1010.

Cooking programs are stored in an area 303 starting at an address 2010. Referring to FIG. 22, in each address of the area, a heating operation control program (cooking program) for each menu of heating processing by a microwave oven is stored together with a cooking program code for specifying that cooking program.

Video information is stored in areas 304, 305, 306, starting at an address 3010. The video information includes completed dish appearance video data, video data of a main material and video data of submaterials.

Images of completed dish appearances are stored in an area 304 starting at an address 3010. Referring to FIG. 23, in each address of the area, data related to an image of a completed menu displayed in both of the "menu selection by specifying food materials" operation and the "menu selection by specifying a menu name" operation is stored together with the completed dish video code and a used cooking program code.

The main material video information is stored in an area 305 starting at an address 4010. Referring to FIG. 24, in each address of the area, video information of "a main material constituting a menu" displayed in the "menu selection by specifying food materials" operation which will be described later is stored together with a main material code.

The submaterial video information is stored in an area 306 starting at an address 5010. Referring to FIG. 25, in each address of the area, video information of "submaterials" displayed in the "menu selection by specifying food materials" described later is stored together with a submaterial code.

The name display information is further divided into menu name display information, operation key display information and function key display information.

The menu name display information is stored in an area 307 starting at an address 6010. Referring to FIG. 26, in each address of the area, menu name information outputted in the "menu selection by menu name specification" operation is stored, divided for each heating category mode (for example, the MICRO heating, the GRILL heating, and so forth) together with a menu name code.

The operation key display information is stored in an area 309 starting at an address 8010. Referring to FIG. 28, in each address of the area, name information designating a selected operation mode to be displayed in a predetermined segment of color liquid crystal display 204 (FIG. 17) is stored together with a operation key code. FIG. 30 is one example of display in display 204. Referring to FIG. 30, operation key information is displayed in both or one of upper and lower segments in the second column from the right end of display 204 in the example. (In FIG. 30, the "COUNT" mode is displayed). In this example, nine kinds of operation key names are prepared as shown in FIG. 28.

The function key display information is stored in an area 310 starting at an address 9010. Referring to FIG. 29, in each address of the area, a name of a function key displayed in display 204 is stored together with a function key code. Referring to FIG. 30, these function key names are fixedly displayed in each of the upper and lower segments in the first column from the right end of color liquid crystal display 204.

The symbol character information includes information displayed in display 204 when the "count mode operation" described later is selected, which is stored in a count mode display data area 308 starting at an address 7010. Referring to FIG. 30, these symbol and character information includes symbols displayed in respective segments on the lower side in the left five columns in display 204 ("LARGE", "MEDIUM", "SMALL", "FREE", for example) and data for displaying operation guide or the like in area 311. In FIG. 30, to simplify the figure, the operation guide is not shown. Referring to FIG. 27, in each address of the area 308, character-symbol information which is display data in the count mode is stored together with a code indicating the count mode.

The microwave oven using a microcomputer according to one embodiment of the present invention described above operates as described below. The operation of the microwave oven includes a menu selecting process, a process of managing the number of times of use of a cooking program, and a cooking program input process.

Before specifically describing the operation, the basic idea of the invention will be described below.

An object of the present invention is to group all the cooking programs stored in main memory 215 through IC card 216a or RAM pack 216b, which are external storing mean into a plurality of groups depending on the number of times in use thereof. In the present embodiment, cooking programs are divided into four groups; large, medium, small and not used, corresponding to the frequency in use thereof. The grouping is made with comparison between the number of use of each program and a given reference value of the frequency in use. The grouped result is displayed as a combination of three kinds of symbols designating levels of a frequency of use in the present embodiment.

Four kinds of references of the frequency in use are prepared as described above in the present embodiment. The first one is for the case where it is not used at all. The second one is for the case where the number of use of a program is in the range of 1-3. When presence of the programs in this range occupies 15% or more of all the programs, the symbol "SMALL" is displayed. The third one is for the case where the number of use is 4 through 6 times. If presence of programs in the range is 15% or more at the number of all the programs, the symbol "MEDIUM" is displayed. The fourth one is for the case where the number of use is seven times or more. If the number of programs present in this range is 30% or more of the number of all the programs, the symbol "LARGE" is displayed.

In the present invention, which operation will be described later, the above-mentioned four kinds of use frequency reference values are selected. And, as shown in FIG. 30, in the present embodiment, presence of programs of use frequencies of large through small only is displayed. However, it is possible to add a symbol about a program corresponding to the number of use of zero times. In this case, in order to indicate presence of a program with the number of use of 0 times, a symbol of "ZERO" may be added, for example. In this case, presence of "idle program" which has not been used is spotlighted.

The microwave oven includes operation modes of a clock mode, a count mode a menu selecting mode and a cooking execution mode. The clock mode is a mode for displaying the present time, and is an operation mode at the time of power-up of the microwave oven or during a time other than the cooking operation.

FIG. 30 is a display on display 204 in the "COUNT mode" prepared next to the clock mode in control unit 105. The count mode is to check the conditions of use of all the cooking programs and display the same. The display shown in FIG. 30 indicates that the programs are divided into at least three kinds of groups according to the above-described reference, that is, ones which belong to a group with large frequency in use, ones which belong to the medium group, and ones which belong to the small group.

In the above-described microwave oven, with progress of use of cooking programs, the sorts and combinations of displayed symbols change. When there is a tendency of unbalanced use of particular cooking programs, there appears a characteristic tendency especially in change with time of combinations of symbol. FIGS. 31 (a)-(e) show a standard pattern of change of symbols (that is, the change in conditions in use of cooking programs). The pattern shows a pattern which appears when all the programs are equally used by using both of "cooking programs which have been used" and "cooking programs which have not been used" with consideration.

In this pattern, first as shown in FIG. 31 (a), only presence of a group with a low frequency in use is displayed. With further progress in use, a symbol "MEDIUM" (FIG. 31 (b)) indicative of presence of a group with a higher frequency in use and a symbol "LARGE" (FIG. 31 (c) designating presence of the highest group are added in the combination of the use frequency symbols.

With further progress in equal use of cooking programs, as shown in FIGS. 31 (d) and 31 (e), the display of symbols of the low and medium frequencies in use are sequentially eliminated. Finally, only the symbol of "LARGE" remains, which indicates that all the cooking programs are evenly used with a high frequency.

As a specific example of such a use pattern, the case below is a possibility. A housewife in a dual-income family has limited time for preparation of dishes on the working days, so that she often uses cooking programs of menus in which she is skillful (hereinafter referred to as "matured experience menu") because she has experiences of cooking and the procedure from precooking to heating with a microwave oven can be proceeded smoothly. These menus belong to the use frequency group of "MEDIUM" or higher.

On the other hand, even such a user possibly tries menus with poor cooking experience (hereinafter referred to as "novel menu") on holidays when the user has enough time for preparation of dish. In this way, a menu with at least three cooking experiences on holidays shifts to the above-described "matured experience menu."

With parallel use of cooking programs of "matured experience menus" and "novel menus" as described above, it appears that the combination of symbols of use frequency changes according to the standard pattern shown in FIG. 31.

Figure 32:
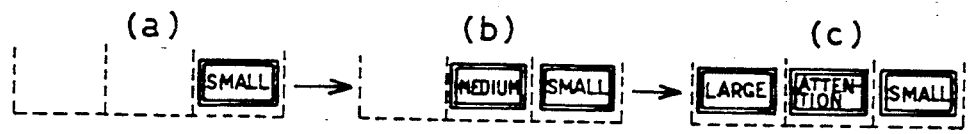
FIG. 32 is a pattern of change with time of symbols indicating a frequency in use in the case where the frequency in use is unbalanced.

On the other hand, in FIGS. 32 (a)-(c), an "extreme pattern" in changes of a use frequency pattern is shown. The pattern designates change with time of combinations of symbols when the selection of cooking programs is unbalanced. Unbalanced use of cooking programs produces a pattern in which only cooking programs with experiences are used despite the fact that there still remains cooking programs of "novel menu" after using cooking programs of the "novel menu" a certain number of times.

In this pattern, as shown in FIG. 32 (a), a symbol of a small use frequency is displayed, and subsequently a symbol of the use frequency "medium" is displayed, and then "matured experience menus" with cooking experiences only are selected. As a result, the symbol of use experience "MEDIUM" disappears and only symbols of "LARGE" and "SMALL" remain.

In such a pattern, preparation for dinner and cooking work may be performed speedily. However, selection in a wide range sufficiently utilizing all the prepared menus is not made. Accordingly, an interval of repeating the same menu is short and variation of menus is limited. For ones who are provided with a dish, so-called "surfeiting" occurs an early time. Also, there is a possibility of frequent occurrence of "idle programs" which will never be used.

The present invention has the first feature that as a menus which are selected according to such an unbalanced use pattern is displayed. The display in FIG. 32 (c) is one example of such a display. In this display, the symbol "ATTENTION" displayed in the position of "MEDIUM" shows that the frequency in use of programs is inclining to "LARGE" and "SMALL". It calls the user's attention.

It is expected that the user recognizes that the selection of programs is unbalanced with this display and intentionally uses cooking programs of "novel menu." In this way, it is expected that the condition of use thereafter implements the change as shown in the above-described FIGS. 31 (c)-(e) to proceed along the above-mentioned "standard pattern."

The user can possibly try to use cooking programs of "novel menus" in parallel with those of "matured experience menus" so that the combination of use frequency symbols such as one shown in FIG. 32 (c) is not displayed. Thus, well balanced use of all the prepared cooking programs can be achieved. Also for ones who are fed, the early "surfeit" can be avoided.

Figure 33:
FIGS. 33 and 34 are display examples illustrating timing for exchanging external storing media.
Figure 34:

Furthermore, if all of the prepared cooking programs are evenly used as described above, requirements of exchanging cooking programs may occur. FIGS. 33 and 34 illustrates display in the case when a symbol "TIME FOR EXCHANGE" is outputted indicating that it is time to exchange external storing means such as the above-mentioned IC card or RAM pack. With exchange of external storing means, new cooking programs are loaded in a main memory, which implements change of variations in cooking programs.

FIG. 33 shows that the symbol of "TIME FOR EXCHANGE" is outputted to a position at which a symbol "SMALL" is originally displayed in FIG. 31 (d). FIG. 31 (d) shows a stage at which there exist no cooking programs with low frequency in use which have been used for three times or less. It is considered that all the prepared cooking programs have been used. Accordingly, this stage is selected as a time suitable for the first exchange of external storing means.

With automatic presenting of a symbol "TIME FOR EXCHANGE" prompting a user to exchange external storing means, it is expected that the user purchases a new external storing medium. With loading of new cooking programs in the main memory, repeated cooking in a limited range can be avoided.

FIG. 34 shows the same pattern as the pattern shown in FIG. 31 (e), but in addition to the "TIME FOR CHANGE" symbol in FIG. 33, a symbol of "TIME FOR EXCHANGE" is newly outputted to a position at which the symbol "MEDIUM" is displayed. At the stage shown in FIG. 34, all the cooking programs have been used seven times or more. At this stage, even use has been achieved with respect to all the cooking programs. It is supposed that not only ones to be fed but also a user of a device are "surfeiting" with repeated use of menus stored in the external storing medium prepared the previous time.

At this stage, with display of two symbols "TIME FOR EXCHANGE"s shown in FIG. 34, it is expected that it works as a motivation of purchasing a new IC card or a RAM pack.

A process of selecting menus while specifying a frequency in use of cooking programs which is the second feature of a microwave oven of the present invention will be described below.

Referring to FIG. 30, selection of cooking programs which belong to a group with a particular frequency in use (the used frequency "SMALL", for example) is a possibility. In this case, a user depresses a portion of the symbol "SMALL" in display 204. A signal indicating that the symbol "SMALL" is depressed is transmitted to CPU 213 by transparent electrode sheet 202. CPU 213, when searching main memory 215 to make menu display, displays a particular symbol ("*", for example) indicative of a corresponding menu at a portion of a menu name having the specified frequency in use. A user can correct the unbalanced condition of use of menus by selecting a menu having symbols "*" displayed.

When the frequency in use is not specified, the user depresses a symbol "FREE".

Figure 35:
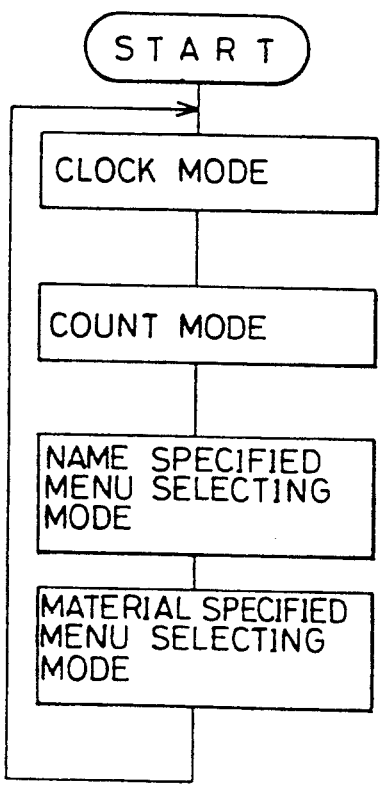
FIG. 35 is a schematic flow chart illustrating transition of operation modes of a microwave oven according to the present invention.
Figure 37B:
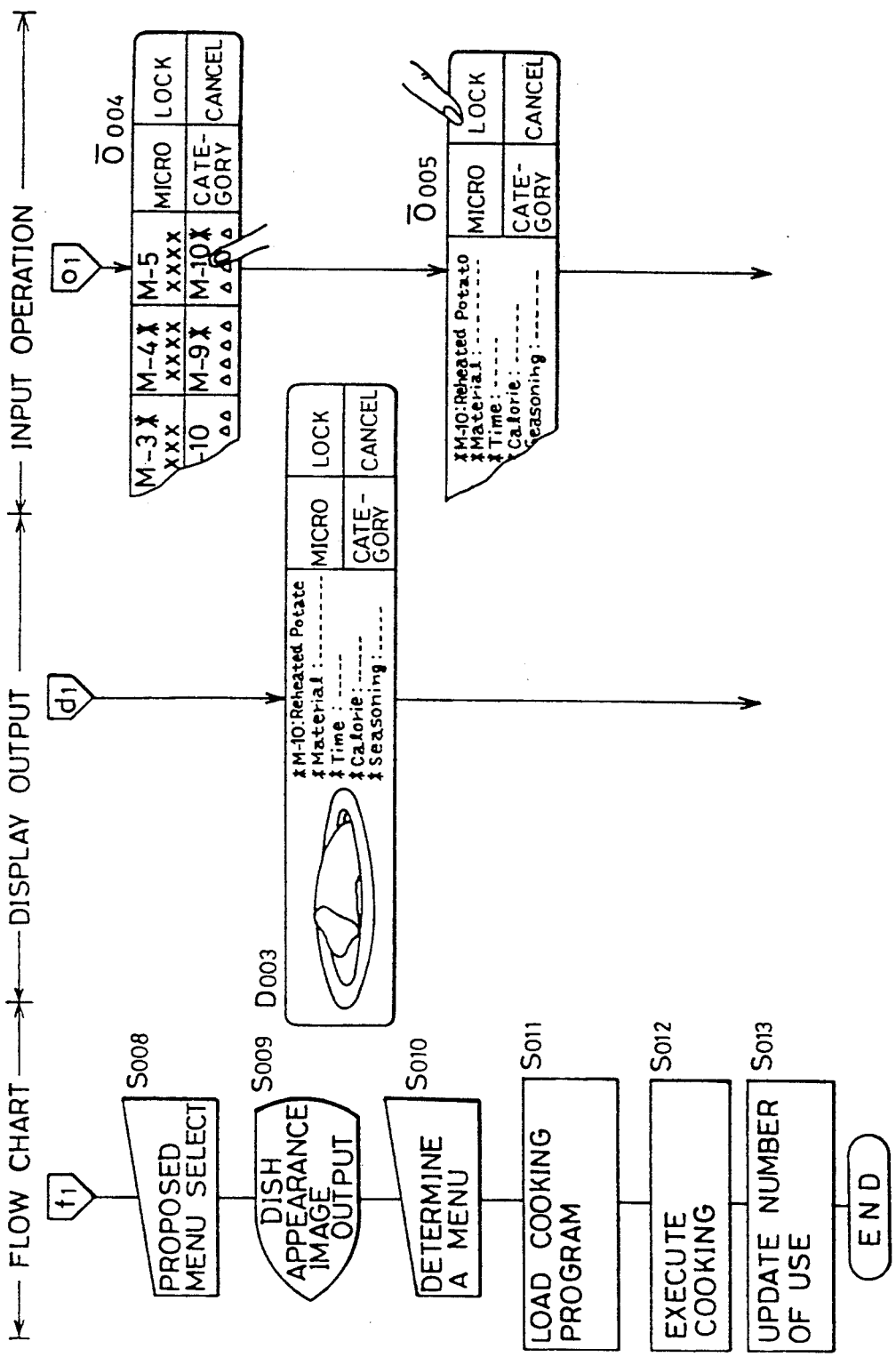

Referring to FIGS. 35, 37A-37B, a cooking menu selecting process for selecting a menu with frequency in use of cooking programs specified, a process of counting the number of use of cooking programs and an input process of cooking programs will be described below.

In FIGS. 37A-37B, an operation method is shown on the right sides, displayed contents outputted to color liquid crystal display 204 of control unit 105 when operation is completed are shown at the center, and a flow chart of a program to be executed by CPU 213 (FIG. 18) is shown on the left side, respectively.

Referring to FIG. 35, when control unit 105 is connected with a power source, an operation mode is automatically set to the "clock mode." The present time set by a rotary encoder or the like (not shown) is displayed at a portion except the "operation key portion" and the "function key portion" in color liquid crystal display 204.

Upon depression of the operation key portion in which the operation mode name "CLOCK" is displayed, the operation mode changes to the count mode. Upon further depression of the operation key portion, the operation mode changes to the name-specified menu selecting mode, and upon further depression of the operation key portion, the operation mode proceeds to the material-specified menu selecting mode, respectively. Depression of a corresponding operation key portion in the material-specified menu selecting mode, the operation mode returns to the clock mode. The operation therebetween will be described in more detail below.

Referring to FIG. 37A, in step S001, as shown in the operation step 01, an operation key portion in which an operation mode name "CLOCK" is displayed is depressed by a user. The operation corresponds to the "COUNT mode" selecting operation.

In step S002, the "COUNT mode" is executed. In step S002, a process is executed wherein a combination of symbols reflecting the current numbers in use of all the cooking programs are determined in symbols designating the frequencies in use of cooking programs, a symbol "ATTENTION" designating advice to a user and a symbol of "TIME FOR EXCHANGE." The flow chart in this process will be described later.

In step S003, an input picture is displayed for specifying the "frequency in use" of a cooking program of a menu to be selected. In the combination of symbols designating the frequency in use outputted to the screen, the current condition of use of all the cooking programs is shown divided into three groups of frequencies in use described above.

In step S003, as shown in the display step D001, setting of an operation mode to "COUNT mode" is indicated by the display "COUNT". Furthermore, although it is not shown, operation guides for specifying or not specifying the frequency in use are displayed in operation message area 311.

In step S004, as shown in the operation step $\overline{O}$002, the group of the frequency in use "SMALL" is selected, for example, In step S005, as shown in the operation step $\overline{O}$003, the operation key display portion displaying "COUNT" is depressed by a user. The operation of selecting an operation mode is thus executed.

In step S006, search of menu names is executed in menu retrieving data area 301 (FIG. 19). At that time, a check is made as to whether each menu satisfies the condition of the use frequency specified in step S004 or not.

In step S007, an input image of the "menu name listing menu selecting mode" is displayed. As shown in the display step D002, an operation mode named displayed in the operation key unit becomes "CATEGORY" in place of the "COUNT." The small division display of the operation mode becomes "MICRO." This means that a menu name which belongs to the heating category mode, that is, the microwave heating, is displayed in the "menu name listing menu names of "microwave heating" are displayed. Furthermore, on the right side of the menu code of the menus which are determined to satisfy the use frequency condition specified in step S004 as a result of the searching in step S006, the above-mentioned symbols "*" are displayed.

In step S008, as shown in operation step $\overline{O}$004, a user depresses a menu selection key portion of a desired menu having the symbol "*".

In step S009, as shown in display step D003, an appearance of the menu specified in step S008 is displayed. The appearance is obtained by searching the completed dish image data area shown in FIG. 23 on the basis of the "completed dish image video code" of FIG. 20.

In step S010, as shown in operation step $\overline{O}$005, the user confirms the displayed image and if it is what the user likes, depresses the "LOCK" key which is one of the function keys. Thus, this menu is selected.

Although not shown in the figure, if the user does not like it, the user depresses another function key "CANCEL." With this operation, the control returns to step S007. Accordingly, the user can execute the "menu selecting operation" again.

In step S011, the cooking program of the selected menu is read out and transferred to the above-mentioned control unit controller 209. The above-mentioned cooking program is loaded in a heating control unit provided in the control unit controller 209.

In step S012, cooking is performed according to the loaded cooking program.

In step S013, update is performed as to the past record data of use of the menu stored in the location in an address of the executed cooking program in the above-mentioned "menu retrieving data area" 301.

Figure 38A:
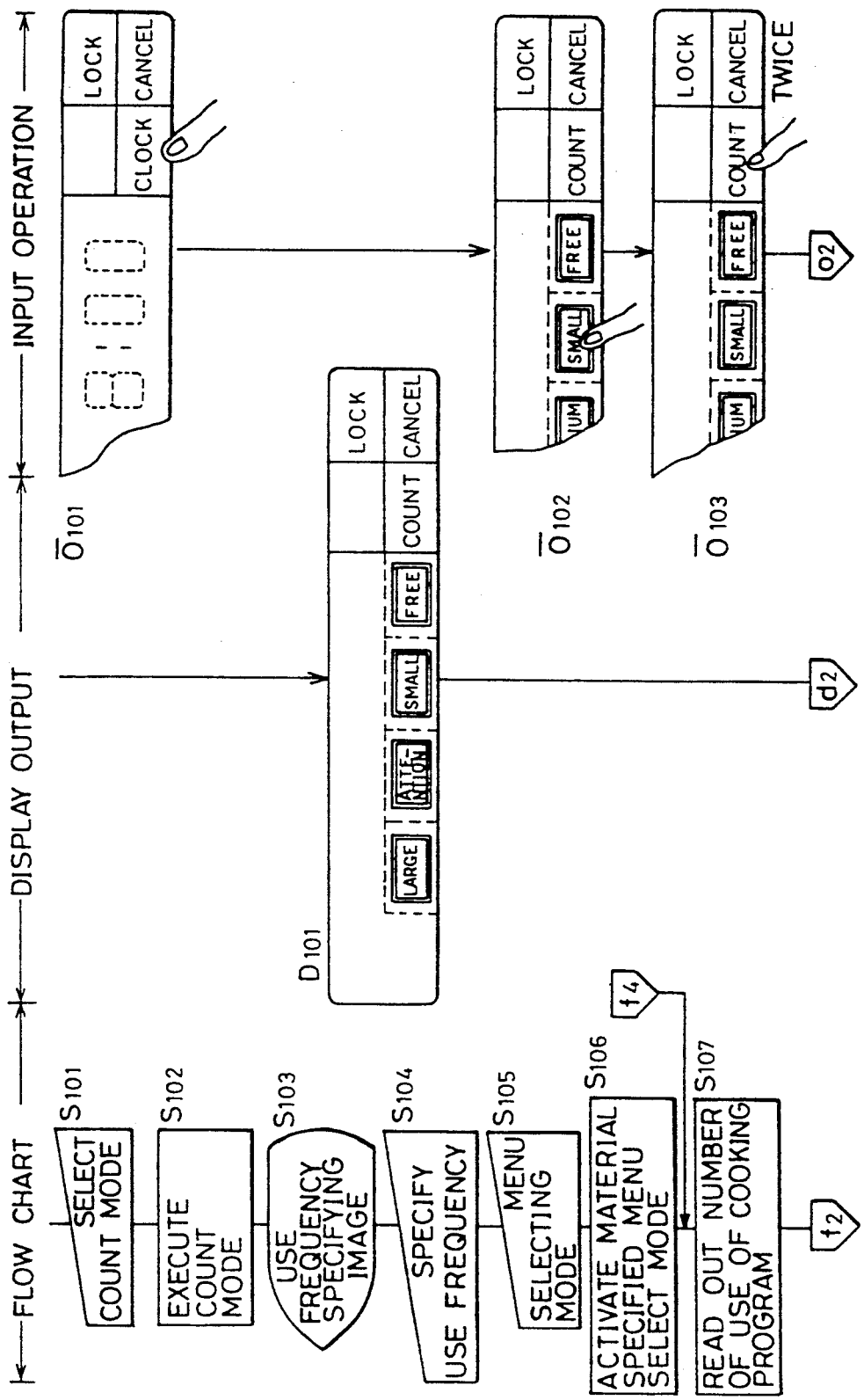
Figure 38B:
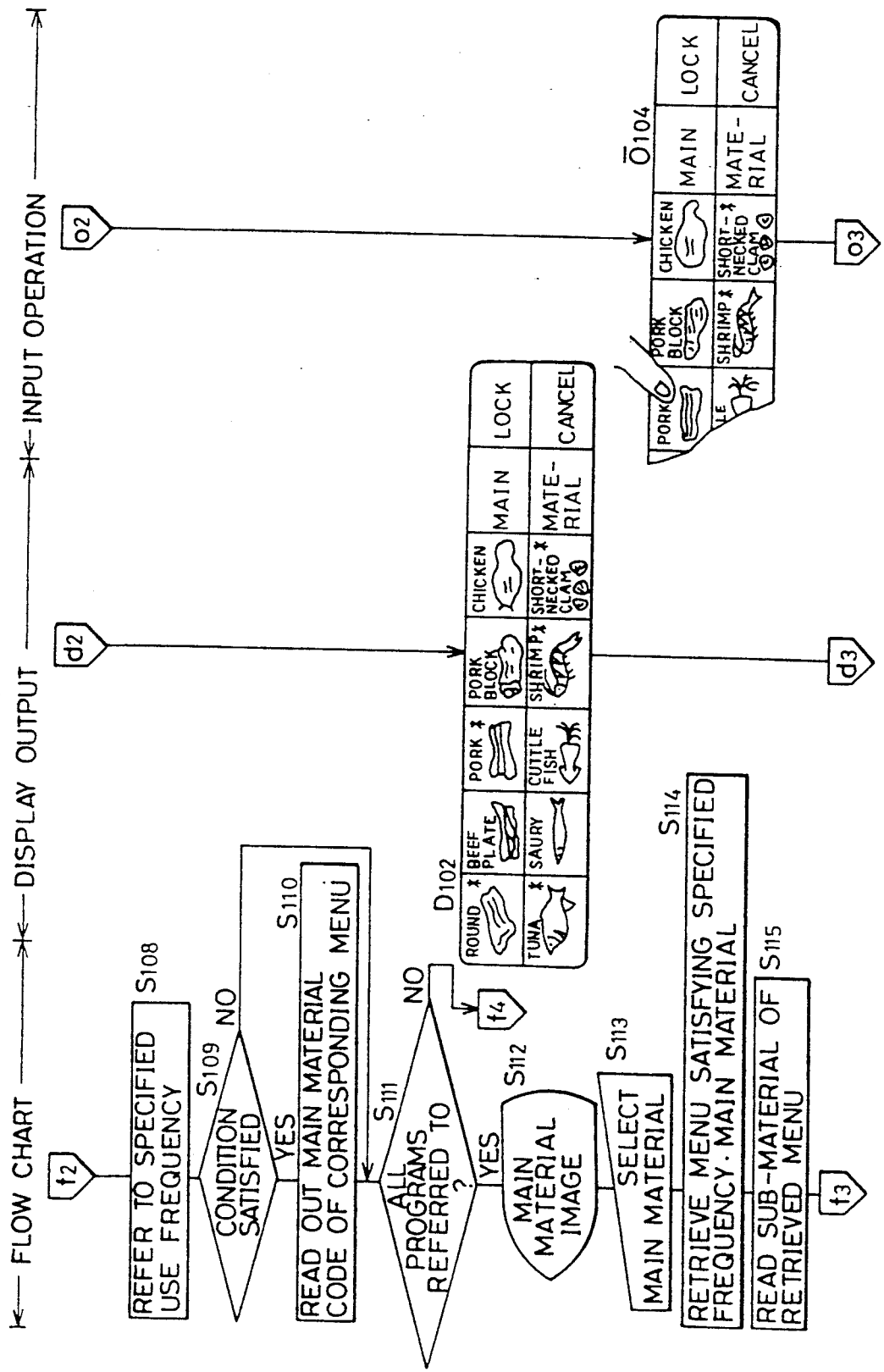

FIGS. 38A–38C are operation charts of the "menu selection by food material specification."

In step S101, as shown in operation step $\overline{O}$101, upon depression of the operation key portion in which "CLOCK" is displayed, the count mode is selected.

In step S102, the program of the count mode is executed. As described above, by this process, a process of determining a combination of symbols indicating use conditions of all the cooking programs and symbols "ATTENTION", "TIME TO EXCHANGE" indicative of advice to the user is executed.

In step S103, as shown in display step D101, an input image is displayed for specifying a frequency in use of a cooking program of a menu which is selected The image also serves as an output display indicating conditions of the use frequency of all the cooking programs In display step D101, as shown in FIG. 32 (c), the symbol "ATTENTION" is displayed for indicating occurrence of a "troublesome condition" due to an "extreme pattern."

This display suggests that a particular cooking program is repeatedly used and, on the other hand, there exist cooking programs used three times or less. With this display, it is known that the cooking programs are unevenly used. At this time, the operation mode name is "COUNT" instead of "CLOCK."

In step S104, as shown in operation step $\overline{O}$102, for selecting a menu which belongs to a group used with low frequency considering the warning by the symbol "ATTENTION", the use frequency key in which the symbol "SMALL" is displayed is depressed.

In step S105, as shown in operation step $\overline{O}$103, the operation mode selecting key portion is depressed twice. With this operation, as already described referring to FIG. 35, the "menu selecting mode by food material specification" is selected.

In step S105, the "menu selecting mode by food material specification" is activated.

In step S107, the number of use of cooking programs, or respective menus are read out.

Referring to FIG. 38B, the read number of use and the value of the selected frequency in use are compared in step S108.

In step S109, a determination is made as to whether the value of frequency in use of the program satisfies the specified value or not. If it is satisfied, the flow proceeds to step S110, and when it is not, the flow proceeds to step S111.

In step S110, a main material code included in the menu of the cooking program is read. The control proceeds to the step S111 thereafter.

In step S111, a determination is made as to whether the processes from step S107 to step S111 have been practiced for all the cooking programs. If the result of the determination is YES, the flow proceeds to S112, and if it is not, the flow returns to step S107.

In step S112, on the basis of the main material code read in step S110, an image of food main material read out from data area 305 (FIG. 19) is displayed. As shown in display step D102, the name of the operation mode changes from "COUNT" to "MATERIAL," and also "MAIN (main material)" is displayed as a subitem of the "MATERIAL." This display shows that the operation mode is "selecting operation of food main material" in the "menu selecting mode by food material specification."

In the display, together with an image of the main material, a symbol "*" indicative of a selected objective is displayed beside the image of the main material if the menu is determined to satisfy the selected value of frequency as a result of steps S107-S111.

In step S113, as shown in operation step $\overline{O}$104, a user selects a desired main material from those with symbols "*" and depresses a corresponding key portion.

In step S114, retrieval of a menu including the selected food material (main material) and also satisfying the specified frequency in use is executed.

In step S115, a sub-material code included in the menu retrieved as a result of step S114 is read out.

Referring to FIG. 38C, in step S116, as shown in display step D103, "SUB (submaterial)" is displayed in place of "MAIN" in a detailed item of the operation mode name. This shows that the operation mode is for selecting food submaterials. On the basis of the read submaterial code, in step S116, sub-material video data area 306 (FIG. 9) is searched and an image of corresponding sub-material is displayed. The user determines as to whether the submaterial is to be specified or not.

In step S117, as shown in operation step $\overline{O}$105, specification of sub-material is made. When specifying, one or two sub-material selection key portions can be depressed. When not specifying, a single arbitrary key portion in which a sub-material image is not displayed is depressed.

In step S118, retrieval of a menu satisfying the combination of the selected food materials and specified frequency in use is executed, and a corresponding menu code and a completed appearance image code of the menu are read out.

In step S119, as shown in display step D104, on the basis of the completed appearance image code read out in step S118, the completed image of the menu is taken out of data area 304 (FIG. 19) and displayed. In the detailed item of the operation mode, in place of "SUB", "MENU" is displayed. This shows that switched display can be made by depressing the key portion when there are a plurality of readout completed dish appearance codes. When the readout completed dish appearance image codes are plural, a symbol "$\frac{1}{2}\rightarrow$" or "$\frac{1}{2}\rightarrow$" is displayed on the left upper side of the displayed dish image. The symbol "$\rightarrow$" instructs an operation of depressing the "MENU" key portion. The symbol "$\frac{1}{2}$" shows that there exist two dish image codes and one currently displayed is the first one.

In step S120, as shown in operation step $\overline{O}$106, the user depresses the "LOCK" key in the function key unit when the user accepts the displayed menu. Information of accepting the displayed menu is thus applied to the program. Although not shown in the operation chart, when not accepting the displayed menu, the function key "CANCEL" is depressed once or twice. When the cancel key is depressed once, the flow returns to step S116 and when it is depressed twice, the flow returns to step S112.

In step S121, a cooking program of the selected menu is read out of the cooking program storing area 303 (FIG. 19), is transferred to control unit controller 209 (FIG. 17 (d)), and loaded in the heating controlling unit.

As shown in the data area 301 for menu retrieval of FIG. 20, in selecting menus by specifying food materials, one kind of main material code and two kinds of sub-material codes can be selected as keys for retrieval. When the main material code is specified, the remaining sub-material codes are not essential requirements. This may be specified in the range of the user's knowledge. If the number of specified sub-material codes is large, the number of outputted menu images will be small. On the contrary, if the number of specified codes is small, the number of outputted images will be large.

The maximum number of submaterials which can be specified is two. When two kinds of sub-materials are specified and the combination is not appropriate, the following processings are performed. In this case, assuming that the same main material is specified, retrieval is executed interpreting that specification is made twice for a single sub-material. For example, suppose a case where a main material code MZ - 01 is specified. In this case, it is assumed that sub-material codes SZ - 01, SZ - 03 are selected, for example. Furthermore, if the combination of codes SZ - 01, SZ - 03 is not appropriate, retrieval is performed assuming that the combination of main material MZ - 01 and the sub-material SZ - 01 and the combination of the main material MZ - 01 and the sub-material SZ - 03 are both specified.

In step S122, the selected cooking program is executed.

In step S123, addition of the number of use of the cooking program of the selected menu is performed. Furthermore, the data of the menu stored in the address of the corresponding cooking program in the location (FIG. 20) of the past record in the above described data area 301 for data retrieval (FIG. 19) is updated.

By operation as described above, after the frequency in use of the cooking program is specified, selection of a menu and execution of cooking are performed according to the specified combination of the main material and the sub-materials. In this process, the past use record of the cooking program is also updated, and the distribution of the past record of use of cooking program is displayed on the basis of the latest past use record in the next count mode operation.

Figure 36:
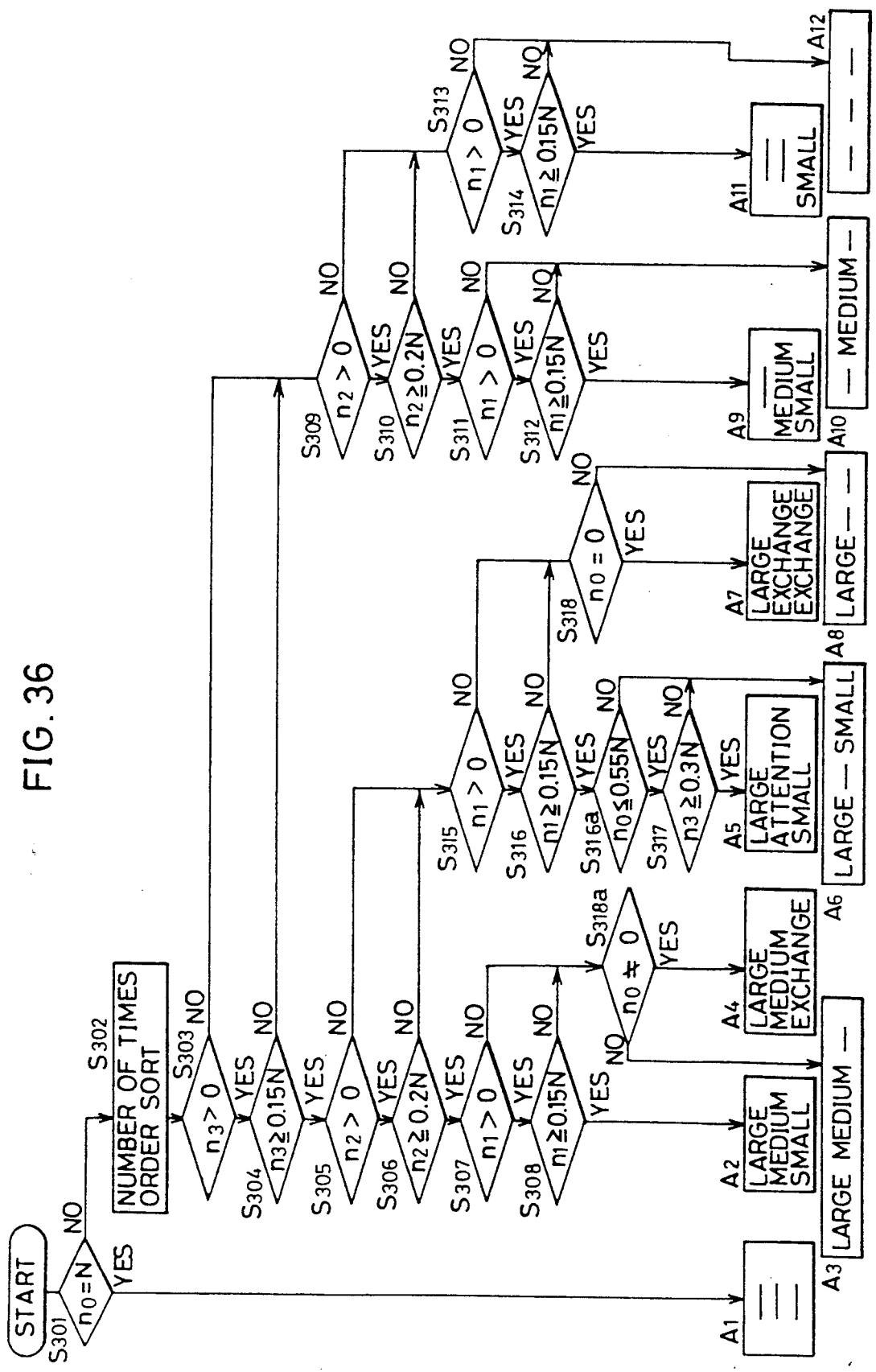
FIG. 36 is a flow chart of a program for determining a symbol indicating a frequency in use.

Referring to FIG. 36, in the following will be described a flow of a program performing processings of analyzing the number of use of all the cooking programs and determining a combination of symbols indicating the current condition of the use. In FIG. 36, the total number of cooking programs, the number of cooking programs which have never been used, the number of cooking programs which have been used one through three times, the number of cooking programs which have been used four through six times, and the number of cooking programs which have been used seven times or more are denoted by the expressions N, $n_0$, $n_2$, and $n_3$, respectively.

In FIG. 36, furthermore, "LARGE", "MEDIUM", "SMALL" are symbols indicative of the magnitude of the frequency in use, "ATTENTION" is a symbol for calling to the user's attention the occurrence of unbalanced distribution of use, and "EXCHANGE" is a symbol indicative of a time for exchanging the external storing medium being used. Furthermore, a blank space on the display is indicated by "—".

Referring to FIG. 36, in step S301, a determination is made as to whether the program number $n_0$ is equal to N or not. If the result of the determination is YES, the control proceeds to step Al, where a determination is made that all the symbols should be blanks. This is because none of the cooking programs has been used.

If the result of the determination in step S301 is NO, the control proceeds to step S302. In step S302, the data related to all the cooking programs is sorted in the order of the numbers of use thereof.

Subsequently, in step S303, a determination is made as to whether $n_3$ is larger than 0 or not. If the result of the determination is YES, the control proceeds to step S304, and otherwise the control proceeds to step S309.

In step S304, a determination is made as to whether $n_3$ is 15% or more of the number n. If the result of the determination is YES, the control proceeds to step S305, and otherwise the control proceeds to step S309.

Step S303 is provided for dividing cases of determining a combination of symbols. Step S304 is for excluding a case where $n_3$ is not more than a certain number. Without such limitation, the symbol "LARGE" will be displayed even when $n_3$ is only one. In such a case, the indication would not be suitable for showing the distribution.

Such conditions as described above are also provided to other use frequencies. However, they are not described in detail in the description below.

In step S305, a determination is made as to whether the number $n_2$ is not 0. If the result of the determination is NO, the control proceeds to step S315, and otherwise the control proceeds to step S306.

In step S306, a determination is made as to whether the number $n_2$ is 20% or more of the number N. If the result of the determination is YES, control proceeds to step S307, otherwise control proceeds to step S315.

In step S307, a determination is made as to whether the number $n_1$ is larger than 0 or not. If the result of the determination is YES, control proceeds to S308, and otherwise control proceeds to step S318.

In step S308, a determination is made as to whether the number $n_1$ is 15% or more of the number N. If the result of the determination is YES, control proceeds to step A2, and otherwise control proceeds to step S318a.

In step A2, since cooking programs which belong to each of frequency groups in use of one to three times, four to six times, and seven times or more exist, respectively, and also they exist for a certain number or more, all the symbols "LARGE", "MEDIUM", "SMALL" are displayed.

In step S318a, a determination is made as to whether the number $n_0$ is not 0. If the result of the determination NO ($n_0 = 0$), control proceeds to step A3, and otherwise ($n_0 \neq 0$) control proceeds to step A4.

In step A3, since cooking programs which belong to each of frequency groups in use of four to six times and seven times or more exist to a certain number or more, and also a program which has never been used exists, only symbols "LARGE", "MEDIUM" are displayed. In step A4, since cooking programs used four to six times and programs used seven times or more exist and a cooking program used three times or less does not exist, a symbol "EXCHANGE" indicating a time for exchanging external storing medium is displayed together with the symbols "LARGE" and "MEDIUM".

A description will be made below about the case where the control proceeds to step S309 from step S303 and step S304. In this case, it should be noted that cooking programs which have been used seven times or more do not exist over a certain number.

In step S309, a determination is made as to whether the number $n_2$ is larger than 0 or not. If the result of the determination is NO, control proceeds to step S313, and otherwise control proceeds to step S310.

In step S310, a determination is made as to whether the number $n_2$ is 20% or more of the number N. If the result of the determination is NO, control proceeds to step S313, and otherwise control proceeds to step S311.

With steps S309, S310, case division has been made as to whether a certain number or more of cooking programs which have been used four to six times exist or not.

In step S311, a determination is made as to whether a cooking program which has been used once to three times exists or not. If the result of the determination is NO, control proceeds to step A10, and otherwise control proceeds to step S312.

In step S312, a determination is made as to whether the number $n_1$ is 15% or more of the number N. If the result of the determination is NO, control proceeds to step A10, and otherwise control proceeds to step A9.

By steps S311, S312, case division has been made as to whether a certain number or more of cooking programs which have been used once to three times exist or not.

In step A9, since no cooking program exists which has been used seven times or more and both a certain number of cooking programs exist which have been used once to three times and four to six times, the symbols "MEDIUM" and "SMALL" are displayed. In step A10, a certain number or more of cooking programs which have been used four to six times only exist, so that the symbol "MEDIUM" only is displayed.

When the flow proceeds to step S313, it should be noted that more than a certain number of cooking programs do not exist which have been used four times or more. In step S313, a determination is made as to whether the number $n_1$ is not 0. If the result of the determination is YES, control proceeds to step S314, and otherwise control proceeds to step A12.

In step S314, a determination is made as to whether the number $n_1$ is 15% or more of the number N. If the result of the determination is NO, control proceeds to step A12 and otherwise control proceeds to step A11.

In step A11, since a certain number or more of the used cooking programs which have been used only once to three times exist, so that the symbol "SMALL" only is displayed. In step A12, since more than a certain number of cooking programs which have been used once or more do not exist, no symbol is displayed.

In the description below, a case where the control proceeds to step S315 as a result of the determinations in steps S305, S306 will be described. In this case, it should be noted that a certain number or more of cooking programs exist which have been used seven times or more and a certain number or more of cooking programs do not exist which have been used four to six times.

In step S315, a determination is made as to whether the number $n_1$ is larger than 0 or not. If the result of the determination is YES, control proceeds to step S316, and otherwise control proceeds to step S318.

In step S316, a determination is made as to whether the number $n_1$ is 15% or more of the number N. If the result of the determination is NO, control proceeds to step S318, and otherwise, control proceeds to step S316a.

It should be noted that cases have been grouped by steps S315 and S316 into a case where there exist a certain number or more of cooking programs which have been used once to three times and a case where it is not so.

In step S316a, a determination is made as to whether the number $n_0$ is 55% or less of the number N. If the result of the determination is YES, control proceeds to step S317, and otherwise control proceeds to step A6.

In step S317, a determination is made as to whether the number $n_3$ is 30% or more of the number N. If the result of the determination is YES, control proceeds to step A5, and otherwise control proceeds to step A6.

In step A5, since the number of cooking programs is rather large which have been used seven times or more, and a certain number of cooking programs also exist which have been used once to three times, and only very small number or none of cooking programs exist which have been used four to six times, a symbol "ATTENTION" indicating unbalanced use is determined together with symbols "LARGE" and "SMALL".

In step A6, since not so many cooking programs exist which have been used seven times or more while a certain number or more of cooking programs exist which have been used once to three times and seven times or more, respectively, and only a certain number or less of cooking programs exist which have been used for two to six times, a determination of occurrence of extremely unbalanced use pattern of cooking programs is not made yet, and only two symbols "LARGE" and "SMALL" are displayed.

A case where control proceeds to step S318 as a result of determinations in steps S315, S316 will be described below. In this case, it should be noted that the number $n_3$ is a certain number or more, that the number $n_2$ is a certain number or less, and the number $n_1$ is also at a certain number or less.

In step S318, a determination is made as to whether the number $n_0$ is equal to 0 or not. If the result of the determination is YES, control proceeds to step A7, and otherwise control proceeds to A8.

In step A7, since there is no program which has never been used, and since the number $n_3$ is especially large, two symbols "EXCHANGE"s indicating a time for exchanging external storing medium are displayed in addition to the symbol "LARGE".

In step A8, although most of the programs have been used seven times or more, there exist programs which have never been used, so that it is not determined yet that it is time to exchange external storing medium, and the symbol "LARGE" only is displayed.

With a program according to the flow shown in FIG. 36 as described above, processing for determining a combination of symbols according to the distribution of frequencies in use of cooking programs can be implemented.

As clearly seen from the above description, in a microwave oven according to the present invention, a plurality of cooking programs supplied in a form of external storing medium such as an IC card or a RAM pack are grouped according to a plurality of kinds of predetermined use frequency reference values. On the basis of the grouped results, a combination of symbols indicating each use frequency reference is determined and displayed. The distribution of frequencies in use of all the cooking programs is expressed in an easily understandable manner. Accordingly, it is possible to grasp conditions of use of cooking programs at large in an instant.

The number and specific menu names of cooking programs which belong to respective use frequency groups can be known whenever necessary. As already described in the above embodiment, a symbol "*" is displayed in the vicinity of a menu code which belongs to the specified use frequency group in a displayed menu list, so that the corresponding menu can be known easily and clearly.

The display of total conditions of use of all the cooking programs is spotlighted in total and long-term view with a combination of use frequency symbols. When they are evenly used, or when only partial programs are used in a concentrated manner, such information is clearly presented to a user by a combination of displayed symbols. For example, a symbol "ATTENTION" is displayed when only particular programs are intensively used repetitively.

On the other hand, when all the cooking programs prepared in external storing medium are evenly used and most of the programs have been used four times or more, a symbol indicating "TIME FOR EXCHANGE" of the external storing medium is displayed. When most of the cooking programs have been used seven times or more, two symbols indicating "TIME FOR EXCHANGE" are displayed in the above-described embodiment. A user can be advised at an appropriate time to exchange external storing media.

Menus of cooking programs with high frequency in use are menus with matured experience in the procedure for a user. On the other hand, menus with low frequency in use are considered to be menus which are new to the user or which can be selected only when the user has enough time because they require a long time for cooking. Accordingly, for a user who has limited time for cooking, e.g., a housewife in a dual-income family, it can be said that selecting menus grouped on the basis of the magnitudes of use frequencies as a reference according to time they can spend for cooking is a rational principle in deciding menus. In the present invention, in order to implement such rational menu deciding principle as described above, menus to be selected can be limited by specifying a frequency in use. It enables selection of menus according to the time provided for the user in a short time.

Also, in the present invention, a symbol indicative of a warning is displayed for unbalanced conditions of use of cooking programs. Accordingly, in the following menu selection, menus with low frequency in use can be intentionally introduced. It can exclude occurrence of programs with low frequency in use, or, so-called "idle programs."

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave oven, comprising:
cooking means for cooking food according to a cooking program specifying a procedure of operation of said cooking means;
cooking control data storing means for storing cooking control data for controlling cooking, the cooking control data including a plurality of cooking programs:
cooking program selecting means responsive to manual operation by a user for selecting one of the cooking programs stored in said cooking control data storing means and for providing the selected one of the cooking programs to said cooking means;
use frequency storing means for storing use frequency data indicative of a number of times each of the cooking programs stored in said cooking control data storing means is selected by said cooking program selecting means;

grouping means for grouping the cooking programs into a plurality of groups according to the use frequency data stored in said use frequency storing means; and use frequency information display means for displaying information relating to the number of the cooking programs which belong to each of the plurality of groups grouped by said grouping means.

2. The microwave oven according to claim 1, wherein said use frequency information display means comprises:

use frequency distribution pattern match detecting means for detecting coincidence between a result grouped by said grouping means and a predetermined use frequency distribution pattern; and means for displaying predetermined information on said use frequency information display means in accordance with the predetermined use frequency distribution pattern of which coincidence with the result of grouping of the cooking programs is detected by said use frequency distribution pattern match detecting means.

3. The microwave oven according to claim 2, further comprising:

transferring means for transferring one of the cooking programs from external storing means, which stores a plurality of predetermined cooking programs, to said cooking control data storing means, said use frequency distribution pattern match detecting means including detecting means for detecting that all of the cooking programs stored in said cooking control data storing means are selected a number of times greater than a predetermined number of times.

4. The microwave oven according to claim 1, wherein said cooking program selecting means comprises use frequency specifying means for specifying a desired use frequency range in response to selection of a desired group by the user from among the plurality of groups grouped by said grouping means, said use frequency information display means comprising retrieving means for retrieving a cooking program from said cooking control data storing means having use frequency data within the desired use frequency range specified by said use frequency specifying means, and program display means for displaying the cooking program retrieved by said retrieving means.

5. The microwave oven according to claim 1, wherein said grouping means comprises:

selective grouping means for selectively grouping each of the cooking programs into one of the plurality of groups according to the use frequency data of each of the cooking programs.

6. The microwave oven according to claim 5, wherein said use frequency storing means comprises accumulating number storing means for storing the use frequency data as an accumulated number of times each of the cooking programs is selected, said selective grouping means comprises comparison means for comparing the use frequency data of each of the cooking programs stored in said acumulating number storing each of the cooking programs into one of the plurality of groups according to the comparison.

7. The microwave oven according to claim 5, wherein said use frequency storing means comprises accumulating number storing means for storing the use frequency data as an accumulated number of times each of the cooking programs is selected, said selective grouping means comprises comparison means for comparing the use frequency data of each of the cooking programs with first, second and third predetermined threshold values and grouping each of the cooking programs into first, second, third and fourth groups in accordance with the predetermined threshold values.

8. The microwave oven of claim 7, wherein the first group comprises cooking programs with user frequency data equal to the first predetermined threshold value, the second group comprises cooking programs with user frequency data greater than the first predetermined threshold value and less than or equal to the second predetermined threshold value, the third group comprises cooking programs with user frequency data greater than the second predetermined threshold value and less than or equal to the third predetermined threshold value, and the forth group comprises cooking programs with user frequency data greater than the third predetermined threshold value.

9. The microwave oven according to claim 1, wherein said use frequency information display means comprises:

condition satisfaction detection means for detecting that grouping of the cooking programs by said grouping means satisfies a predetermined condition; and symbol display means for displaying a symbol indicative of when the predetermined condition is satisfied.

10. The microwave oven according to claim 9, wherein said grouping means comprises:

selective grouping means for selectively grouping each of the cooking programs into one of the plurality of groups according to the use frequency data of each of the cooking programs.

11. The microwave oven according to claim 10, wherein said use frequency storing means comprises accumulating number storing means for storing the use frequency data as an accumulated number of times each of the cooking programs is selected, said selective grouping means comprises comparison means for comparing the use frequency data of each of the cooking programs stored in said accumulating number storing means with a predetermined threshold value and grouping each of the cooking programs into one of the plurality of groups.

12. The microwave oven according to claim 10, wherein said use frequency storing means comprises accumulating number storing means for storing the use frequency data as an accumulated number of times each of the cooking programs is selected, said selective grouping means comprises comparison means for comparing the use frequency data of each of the cooking programs with first, second and third predetermined threshold values and grouping each of the cooking programs into first, second, third and fourth groups in accordance with the predetermined threshold values.

13. The microwave oven of claim 12, wherein the first group comprises cooking programs with user frequency data equal to the first predetermined threshold value, the second group comprises cooking programs with user frequency data greater than the first predetermined threshold value and less than or equal to the second predetermined threshold value, the third group comprises cooking programs with user frequency data greater than the second predetermined threshold value and less than or equal to the third predetermined threshold value, and the fourth group comprises cooking programs with user frequency data greater than the third predetermined threshold value.

14. The microwave oven according to claim 13, wherein said first, second and third predetermined threshold values are respectively 0, 3, and 6.

15. The microwave oven according to claim 14, wherein said condition satisfaction detecting means comprises:
   total number detecting means for detecting a total accumulated number of times all the cooking programs are selected;
   number detecting means for detecting the number of the cooking programs which belong to each of the plurality of groups;
   proportion calculating means for producing a proportion of the number of times the cooking programs which belong to each of the plurality of groups are selected to the total accumulated number;
   use rate magnitude determining means for determining whether the proportion of each of the plurality of groups is larger than a respective predetermined reference value for each of the plurality of groups; and
   coincidence determining means for determining coincidence between an actual combination of outputs of said use rate magnitude determining means and a previously prepared combination.

16. The microwave oven according to claim 15, wherein said coincidence determining means determines coincidence between an actual combination of outputs of said use rate magnitude determining means and one of a plurality of previously prepared combinations.

17. The microwave oven according to claim 16, wherein the plurality of previously prepared combinations include a first combination in which the use frequency data of the fourth group is larger than a first predetermined value and the use frequency data of the other groups are smaller than a second predetermined value, and
   said symbol display means includes means for displaying a first symbol for suggesting exchanging cooking programs in response to coincidence of an actual combination of outputs of said use rate magnitude determining means and said first combination.

18. The microwave oven according to claim 16, wherein the plurality of previously prepared combinations include a first combination in which the use frequency data of the third group and the fourth group are larger than a first predetermined value and any of the use frequency data of the other groups are smaller than a second predetermined value, and
   said symbol display means includes means for displaying a first symbol for suggesting exchanging cooking programs in response to coincidence between an actual combination of outputs of said use rate magnitude determining means and said first combination.

19. The microwave oven according to claim 16, wherein the plurality of previously prepared combinations include a first combination in which the use frequency data of the second group and the fourth group are larger than first and second predetermined values, respectively, and the use frequency data of the third group is smaller than a third predetermined value, and
   said symbol display means includes means for displaying a first symbol for suggesting to a suer that use of the cooking programs is unbalanced, in response to coincidence of an actual combination of outputs of said use rate magnitude determining means and said first combination.

20. The microwave oven according to claim 1, wherein said cooking control data storing means comprises:
   category information storing means for storing category information indicating a plurality of categories into either one of which each of the cooking programs is grouped;
   menu information storing means for storing first menu information to which a predetermined plurality of the categories are directly related;
   cooking name storing means for storing a name of cooking of each of the cooking programs and associating the cooking programs with at least one of the plurality of categories;
   cooking program storing means for storing each of the cooking programs associated with a corresponding one of the cooking names; and
   cooking appearance image storing means for storing image data indicating external appearance of cooking for each of the cooking programs.

21. The microwave oven according to claim 20, wherein said category information includes a name of each of the categories.

22. The microwave oven according to claim 21, wherein said cooking program selecting means comprises:
   image display means including a plurality of image display areas for selectively displaying an image;
   a plurality of manually operable operation signal generating means, each associated with a respective one of said image display areas, for generating a respective operation signal in accordance with operation by the user;
   interpreting means for previously storing information related to an image displayed on each of said image display areas and for interpreting the respective operation signal by outputting information related to the image displayed on a respective one of said image display areas;
   processing selecting means for selecting a process in response to an output of said interpreting means; and
   cooking program retrieving means, responsive to selection by said processing selecting means of start of execution of a particular cooking program, for retrieving a corresponding one of the cooking program from said cooking control data storing means and for providing the corresponding one of the cooking programs to said cooking means.

23. The microwave oven according to claim 22, wherein said processing selecting means comprises:
   menu selecting means, responsive to an output of said interpreting means which specifies a menu name, for reading out corresponding menu information from said menu information storing means and providing a list of names of category information related to the read out menu information to said image display means and said interpreting means;

category selecting means, responsive to an output of said interpreting means which specifies a category name, for reading out corresponding category information from said category information storing means and providing a list of names of cooking programs related to the read out category information to said image display means and said interpreting means;

cooking selecting means, responsive to an output of said interpreting means which specifies a cooking name, for reading out corresponding cooking program information from said cooking program storing means and reading out image data designating appearance of a cooking program related to the read out cooking program information from said cooking appearance image storing means, and for providing the image data to said image display means; and specified process executing means, responsive to an output of said interpreting means which specifies execution of predetermined particular processing, for executing the predetermined particular processing.

24. The microwave oven according to claim 23, wherein said specified process executing means includes grouping activating means for activating said grouping means when an output of said interpreting means instructs activation of said grouping means.

25. The microwave oven according to claim 24, wherein said specified process executing means further includes frequency information display means for displaying on said image display means the use frequency data after activation of said grouping means by said grouping means.

26. The microwave oven according to claim 23, wherein said specified process executing means includes group selecting means for selecting a particular one of the groups in response to an output of said interpreting means being a particular value, said category selecting means including determination means for making a determination as to whether the cooking program associated with the selected category belongs to the selected group or not, and appending means, responsive to an output of said determination means, for appending to the cooking specifying information in the list provided to said image display means information for specifying whether each belongs to the selected group or not, and said image display means includes display manner changing means, responsive to the information appended to the cooking specifying information, for making a manner of display of the cooking specifying information different than in other cases.

27. The microwave oven according to claim 26, wherein said display manner change means includes symbol adding means for displaying the displayed cooking specifying information with a predetermined symbol added thereto.

28. The microwave oven according to claim 27, wherein the predetermined symbol added to the cooking name by said symbol adding means includes an asterisk.

29. The microwave oven according to claim 28, wherein said group selecting means includes means for displaying group specifying information for specifying each of the groups associated with said image display areas on said image display means in response to an output of said interpreting means; and group determining means, responsive to the output of said interpreting means corresponding to one of said image display areas, for determining that a group associated with the corresponding one of said image display areas is selected.

30. The microwave oven according to claim 1, wherein said cooking program selecting means comprises:

group selecting means with which the user selects a particular one of the groups;

cooking specifying information producing means for searching said cooking control data storing means and producing a list of information for specifying the cooking program according to a demand of the user;

determining means for making a determination as to whether each of the cooking control data retrieved by said cooking specifying information producing means belongs to the particular group selected and adding particular information at a corresponding portion in the list of information produced by said cooking specifying information producing means in case the cooking control data is determined to belong to the particular group;

display means for displaying the list of information produced by said cooking specifying information producing means in a visible manner; and display manner changing means for displaying an element corresponding to a cooking program which is determined to belong to the particular group by said determining means in a manner which is different from that in a case where it is not.

31. The microwave oven according to claim 30, wherein said display manner changing means includes symbol adding means for adding a predetermined symbol to the cooking specifying information to be displayed.

32. The microwave oven according to claim 31, wherein the predetermined symbol which said symbol adding means added to the cooking specifying information includes an asterisk.

33. The microwave oven according to claim 32, wherein said group selecting means comprises:

image display means having a plurality of image display areas for selectively displaying an image;

operation signal generating means, associated with each of said image display areas, for generating an operation signal related to a respective one of said image display areas in response to operation by a user;

group specifying display means for displaying group specifying information for specifying each of the groups on said image display means associated with one of said image display areas; and group determining means for determining that a group related to a corresponding one of said image display areas is selected by the user in accordance with an output of said operation signal generating means corresponding to one of said image display areas.

34. The microwave oven according to claim 8, wherein said first, second and third predetermined threshold values are respectively 0, 3 and 6.

35. A microwave oven comprising:

cooking means for cooking food in accordance with stored cooking programs;

cooking program storage means for storing the cooking programs;

cooking selection means for retrieving and supplying a user selected cooking program stored in said cooking program storage means to said cooking means;

use rate memory means, coupled to said cooking selection means, for storing and updating user frequency data indicative of the number of times each of the cooking programs is selected;

grouping means, coupled to said use rate memory means, for grouping the cooking programs into groups in accordance with the user frequency data indicative of the number of times each of the cooking programs is selected; and display means, coupled to said grouping means, for displaying group number data indicative of a number of the cooking programs which belong to each of the groups.

36. The microwave oven of claim 35, wherein said grouping means groups the cooking programs into four groups, a first group comprising cooking programs with user frequency data equal to a first predetermined threshold value, a second group comprising cooking programs with user frequency data greater than the first predetermined threshold value and less than or equal to a second predetermined threshold value, a third group comprising cooking programs with user frequency data greater than the second predetermined threshold value and less than or equal to the third predetermined threshold value, and a fourth group comprising cooking programs with user frequency data greater than the third predetermined threshold value.

37. The microwave oven according to claim 36, wherein the first, second and third predetermined threshold values are respectively 0, 3 and 6.

38. The microwave oven according to claim 35, wherein said display means displays symbols indicative of conditions wherein the number of cooking programs which belong to each group exceed predetermined numbers.

39. The microwave oven according to claim 38, wherein said cooking program storage means comprises portable storage means, detachable from the microwave oven, for supplying a variety of cooking programs, the symbols directing the user to exchange portable storage means to supply new cooking programs.

40. A method of operating a microwave oven having cooking means for cooking food in accordance with user selected cooking programs, the cooking program being stored in cooking program memory means, the method comprising the steps of:

retrieving and supplying a selected cooking program from the cooking program memory means to the cooking means;

storing and updating user frequency data which is indicative of a number of times each of the cooking programs is selected;

grouping the cooking programs into groups in accordance with the user frequency data indicative of the number of times each of the cooking programs is selected; and displaying group number data indicative of a number of the cooking programs which belong to each of the groups.

41. The method of operating a microwave oven of claim 40, said step of grouping comprising grouping the cooking programs into four groups, a first group comprising cooking programs with user frequency data equal to a first predetermined threshold value, a second group comprising cooking programs with user frequency data greater than the first predetermined threshold value and less than or equal to a second predetermined threshold value, a third group comprising cooking program with user frequency data greater than the second predetermined threshold value and less than or greater to the third predetermined threshold value, and a fourth group comprising cooking programs with user frequency data greater than the third predetermined threshold value.

42. The method of operating a microwave oven of claim 41, wherein the first, second and third predetermined threshold values are respectively 0, 3 and 6.

43. The microwave oven according to claim 40, said step of displaying comprising displaying symbols indicative of conditions wherein the number of cooking programs which belongs to each of the groups exceed predetermined numbers.

44. The method of operating a microwave oven of claim 43, the cooking program memory means comprising portable storage means detachable from the microwave oven, the method comprising the further steps of:

exchanging the portable storage means to supply new cooking programs in response to display of the symbols.

* * * * *